US012739727B2

(12) United States Patent
Palka et al.

(10) Patent No.: US 12,739,727 B2
(45) Date of Patent: Sep. 15, 2026

(54) CONDITIONAL HANDOVER WITH TARGET MASTER NODE DRIVEN DELAYED SECONDARY CELL GROUP EXECUTION

(71) Applicant: Nokia Technologies Oy, Espoo (FI)

(72) Inventors: Dariusz Palka, Cracow (PL); Halit Murat Gürsu, Munich (DE); Umur Karabulut, Munich (DE); Panagiotis Spapis, Munich (DE); Ahmad Awada, Munich (DE)

(73) Assignee: Nokia Technologies Oy, Espoo (FI)

( * ) Notice: Subject to any disclaimer, the term of this patent is extended or adjusted under 35 U.S.C. 154(b) by 207 days.

(21) Appl. No.: 18/891,785

(22) Filed: Sep. 20, 2024

(65) Prior Publication Data

US 2025/0113281 A1 Apr. 3, 2025

(30) Foreign Application Priority Data

Sep. 29, 2023 (FI) ..................................... 20236088

(51) Int. Cl.
*H04W 36/36* (2009.01)
*H04W 36/00* (2009.01)

(52) U.S. Cl.
CPC ..... *H04W 36/362* (2023.05); *H04W 36/0069* (2018.08); *H04W 36/00725* (2023.05); *H04W 36/0085* (2018.08)

(58) Field of Classification Search
CPC ... H04W 76/20; H04W 72/231; H04W 72/02; H04L 5/001; H04L 5/0094; H04B 7/06968
USPC .......... 455/436, 437, 439, 435.2, 433, 435.1
See application file for complete search history.

(56) References Cited

U.S. PATENT DOCUMENTS 10,849,026 B2 * 11/2020 Kubota ................. H04W 72/21
12,317,143 B2 * 5/2025 Damnjanovic ... H04W 36/0069
2020/0267789 A1 8/2020 Tsai
2021/0258843 A1 8/2021 Awada et al.
(Continued)

FOREIGN PATENT DOCUMENTS

WO 2021/162870 A1 8/2021
WO WO-2022028918 A1 * 2/2022 ........ H04W 36/0069
(Continued)

OTHER PUBLICATIONS

"Msc-generator", Sourceforge, Retrieved on Nov. 7, 2024, Webpage available at :https://sourceforge.net/projects/msc-generator/.
(Continued)

*Primary Examiner* — David Q Nguyen
(74) *Attorney, Agent, or Firm* — Nokia Technologies Oy

(57) ABSTRACT

The present invention is about conditional handover (CHO) in telecommunications networks, and a main point is to pass the responsibility to a target Master Node for triggering the UE to rapid access to Primary Secondary Cell after applying target Primary Cell configuration during a CHO-NR-DC handover. The target MN decides whether to wait further to execute CPC. If measurements are hopeful, completion of execution of the primary secondary cell for dual connectivity is postponed, and L3 measurement results are inspected from the UE. There are three variants, when the target MN requests the UE to access the target Secondary Node; namely RRC-based access target SN trigger, PDCCH-order-based variant and DL MCE-based variant.

22 Claims, 10 Drawing Sheets

(56) References Cited

U.S. PATENT DOCUMENTS

| | | | | |
|---|---|---|---|---|
| 2024/0155450 | A1 | 5/2024 | Gürsu et al. | |
| 2025/0039847 | A1* | 1/2025 | Lin | H04L 5/0053 |
| 2025/0056364 | A1* | 2/2025 | Liu | H04W 76/30 |
| 2025/0106702 | A1* | 3/2025 | Liu | H04W 36/00835 |
| 2025/0374137 | A1* | 12/2025 | Wallentin | H04W 36/0005 |

FOREIGN PATENT DOCUMENTS

| | | | | |
|---|---|---|---|---|
| WO | 2022/058069 | A1 | 3/2022 | |
| WO | 2022/151417 | A1 | 7/2022 | |
| WO | WO-2024237833 | A1 * | 11/2024 | H04W 36/0061 |

OTHER PUBLICATIONS

"3rd Generation Partnership Project; Technical Specification Group Radio Access Network; NR; Multiplexing and channel coding (Release 17)", 3GPP TS 38.212, V17.5.0, Mar. 2023, pp. 1-203.

"3rd Generation Partnership Project; Technical Specification Group Radio Access Network; NR; Medium Access Control (MAC) protocol specification (Release 17)", 3GPP TS 38.321, V17.5.0, Jun. 2023, pp. 1-253.

"3rd Generation Partnership Project; Technical Specification Group Radio Access Network; NG-RAN; F1 application protocol (F1AP) (Release 17)", 3GPP TS 38.473, V17.5.0, Jun. 2023, pp. 1-662.

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331, V17.6.0, Sep. 2023, pp. 1-1137.

"3rd Generation Partnership Project; Technical Specification Group Radio Access Network; NR; NR and NG-RAN Overall Description; Stage 2 (Release 16)", 3GPP TS 38.300, V16.6.0, Jun. 2021, pp. 1-152.

"3rd Generation Partnership Project; Technical Specification Group Radio Access Network; NG-RAN; Architecture description (Release 16)", 3GPP TS 38.401, V16.6.0, Jul. 2021, pp. 1-79.

"3rd Generation Partnership Project; Technical Specification Group Radio Access Network; Study on new radio access technology: Radio access architecture and interfaces (Release 14)", 3GPP TR 38.801, V14.0.0, Mar. 2017, pp. 1-91.

"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.

Office Action received for corresponding Finnish Patent Application No. 20236088, dated Apr. 24, 2024, 11 pages.

"Conditional PSCell addition/change", 3GPP RANWG2 Meeting #108, R2-1914877, Agenda: 6.9.4, InterDigital Inc., Nov. 18-22, 2019, 4 pages.

* cited by examiner

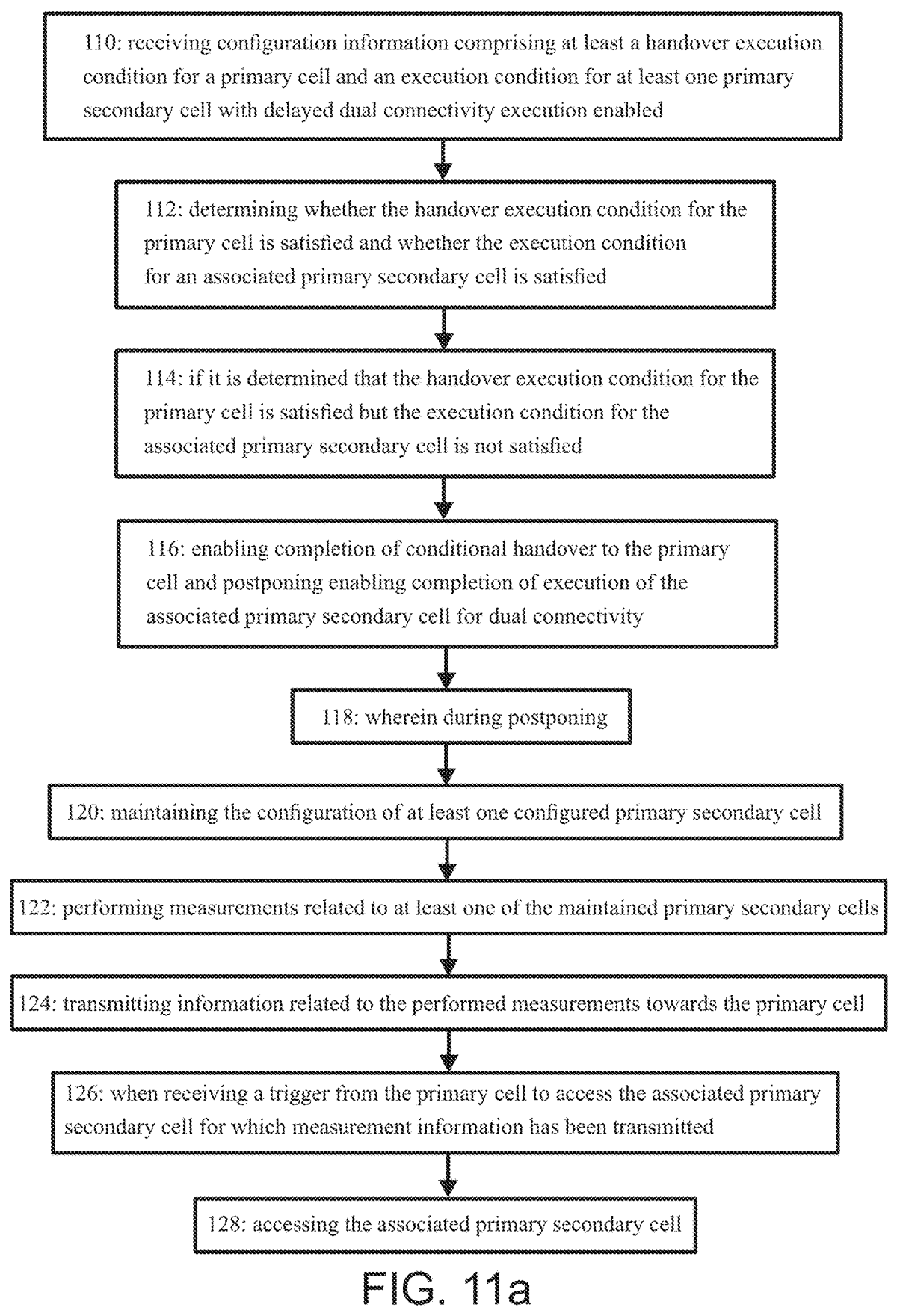

110: receiving configuration information comprising at least a handover execution condition for a primary cell and an execution condition for at least one primary secondary cell with delayed dual connectivity execution enabled 112: determining whether the handover execution condition for the primary cell is satisfied and whether the execution condition for an associated primary secondary cell is satisfied 114: if it is determined that the handover execution condition for the primary cell is satisfied but the execution condition for the associated primary secondary cell is not satisfied 116: enabling completion of conditional handover to the primary cell and postponing enabling completion of execution of the associated primary secondary cell for dual connectivity 118: wherein during postponing 120: maintaining the configuration of at least one configured primary secondary cell 122: performing measurements related to at least one of the maintained primary secondary cells 124: transmitting information related to the performed measurements towards the primary cell 126: when receiving a trigger from the primary cell to access the associated primary secondary cell for which measurement information has been transmitted 128: accessing the associated primary secondary cell

FIG. 11a

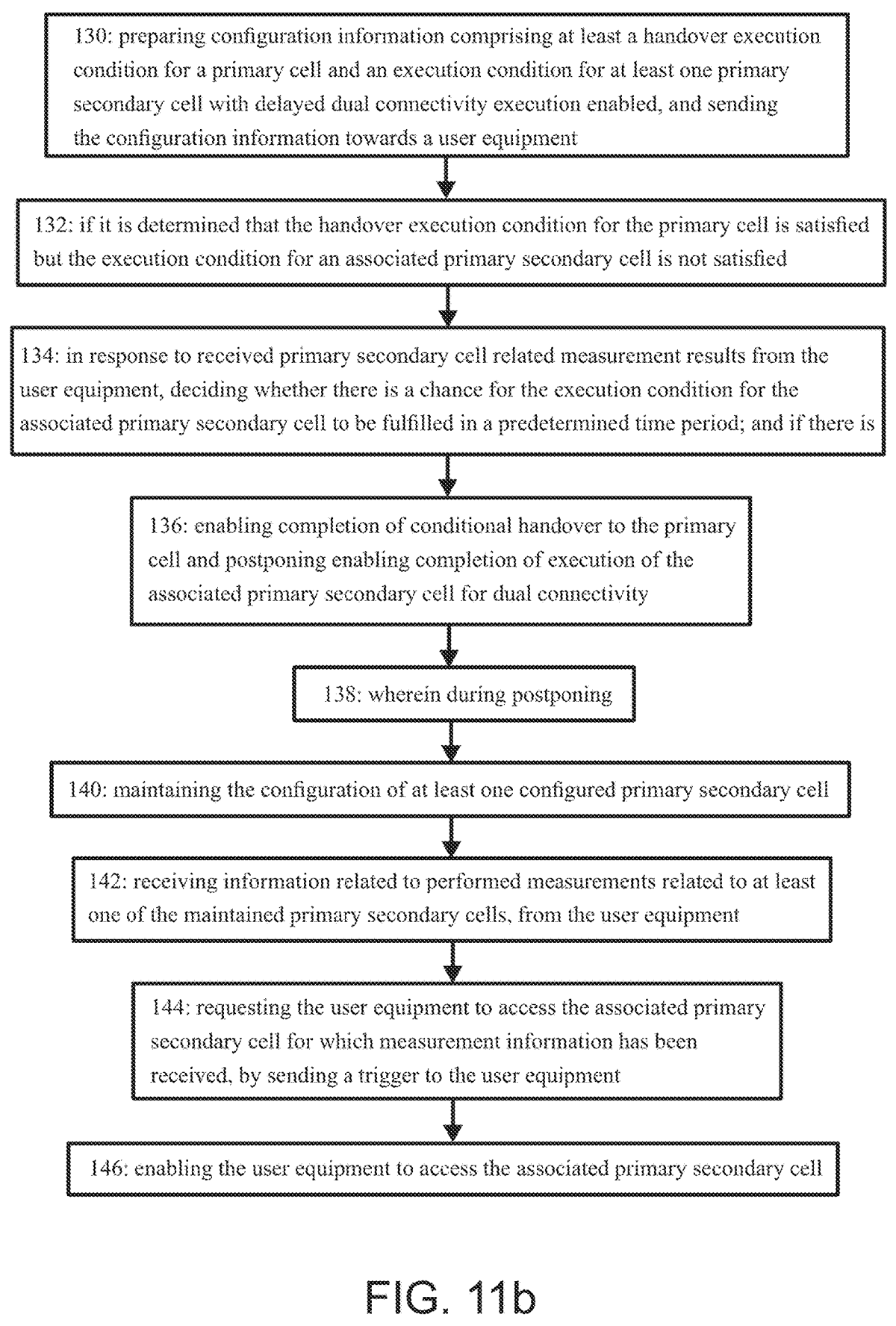

130: preparing configuration information comprising at least a handover execution condition for a primary cell and an execution condition for at least one primary secondary cell with delayed dual connectivity execution enabled, and sending the configuration information towards a user equipment 132: if it is determined that the handover execution condition for the primary cell is satisfied but the execution condition for an associated primary secondary cell is not satisfied 134: in response to received primary secondary cell related measurement results from the user equipment, deciding whether there is a chance for the execution condition for the associated primary secondary cell to be fulfilled in a predetermined time period; and if there is 136: enabling completion of conditional handover to the primary cell and postponing enabling completion of execution of the associated primary secondary cell for dual connectivity 138: wherein during postponing 140: maintaining the configuration of at least one configured primary secondary cell 142: receiving information related to performed measurements related to at least one of the maintained primary secondary cells, from the user equipment 144: requesting the user equipment to access the associated primary secondary cell for which measurement information has been received, by sending a trigger to the user equipment 146: enabling the user equipment to access the associated primary secondary cell

FIG. 11b

CONDITIONAL HANDOVER WITH TARGET MASTER NODE DRIVEN DELAYED SECONDARY CELL GROUP EXECUTION

TECHNICAL FIELD

The present invention relates to cellular telecommunications systems and especially to handling of conditional handover (CHO) in connection with conditional primary secondary cell addition (CPA) and conditional primary secondary cell change (CPC).

BACKGROUND

A conditional handover (CHO) is a feature supported in LTE (Long Term Evolution) and in 5G NR (New Radio). The CHO resembles in many aspects the previously known "ordinary" handover (HO), i.e. the legacy HO. As a main difference to the legacy HO, in the CHO the user equipment (UE) starts the preparations for handover to the target node only when an additional CHO execution condition is met. Another difference between the legacy HO and the CHO is the preparation of multiple target cells in the CHO. Thus, the CHO reserves more resources at target cells than a legacy HO while waiting for the execution.

In multi-radio dual connectivity (MR-DC) the CHO is a limited to a scenario where a target master node (MN) can prepare a single target primary cell of a secondary cell group (PSCell), under the control of a secondary node (SN). This may limit the usefulness of the CHO MR-DC feature where a UE may need to access a different target PSCell while the CHO needs to be executed. A mechanism is under development for CHO in MR-DC where a target MN can prepare multiple target PSCells for the same target primary cell (PCell). A focus is to provide a configuration to a UE which consist of both a conditional handover configuration and a conditional PSCell addition (CPA) or change (CPC) configuration. In other words, a UE will perform conditional handover to both PCell and PSCell, considering the execution conditions of each cell given in the handover configuration.

The UE evaluates CHO and CPC conditions in parallel and the UE executes CHO+CPC configuration only if both conditions are met. However, the order of sending the random-access message to target PCell and target PSCell is not defined. In case of CHO with CPC/CPA, the following three matters apply:

1) UE must access target PCell irrespective of target PSCell access condition.
2) UE cannot access target PSCell if target PCell conditions are not fulfilled. When CPC/CPA conditions are fulfilled but CHO are not met, UE shall wait until PCell access is possible.
3) Once CHO conditions are met, it can appear that PSCell change is not possible anymore.

Hence, there is a problem, which may be determined as follows. When UE accesses primary cell (PCell) but it cannot connect to any of related candidate primary secondary cells (PSCells), a discrepancy between agreed configuration and actual one, appears. UE is configured with dual connectivity (DC), but it cannot use PSCell (in case of SN-handled split bearer, it cannot use PCell for secondary cell group (SCG) bearers, either).

SUMMARY

Now, in an exemplary embodiment, an improved method and technical equipment implementing the method has been invented, by which at least one of the above problems are alleviated and/or addressed. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a summarized aspect of the present invention as a whole, and also comprising various example embodiments, it may comprise the following features:

1. UE synchronizes to target master node (MN) without applying primary secondary cell (PSCell) configuration.
2. UE continues PSCell measurements.
3. Target master node (MN) is delivered by target secondary nodes (SNs) with enough information about PSCells' access to be able to trigger synchronization with any of them by itself (including CFRA case; =contention free random access).
4. Target master node (MN) triggers UE to synchronize to PSCell based on delivered PSCell measurements. Three variants are presented:
   4.1. Radio Resource Control (RRC)-based (new type of RRCReconfiguration with sync needed).
   4.2. Physical downlink control channel (PDCCH) order based (DCI1_0 modification needed to indicate PSCell to synchronize, new pair of F1-C messages of Req/Resp type is needed).
   4.3. Medium Access Control Control Element (MAC CE or MCE) based (new downlink MCE needed: AccessSN MCE, new pair of F1-C messages of Req/Resp type is needed).
5. Delayed PSCell synchronization may be guarded with target master node (MN) timer (implementation-specific). On timer's expiration, dual connectivity (DC) is de-configured and UE starts to run in standalone (SA) mode.

The main point of the present invention is to pass the responsibility to target MN for triggering UE to rapid access to PSCell after applying target PCell configuration during a CHO-NR-DC handover.

The rationales/advantages may be stated as follows. The network has access to more information and hence, it knows better when to perform the primary secondary cell (PSCell) change. Less complex UE implementation with regards to radio resource control reconfiguration is also obtained compared to the prior solutions.

According to a first aspect of the present invention, there is provided a user equipment comprising means for enabling conditional handover with delayed dual connectivity, the user equipment comprising:

means for receiving configuration information comprising at least a handover execution condition for a primary cell and an execution condition for at least one primary secondary cell with delayed dual connectivity execution enabled;

means for determining whether the handover execution condition for the primary cell is satisfied and whether the execution condition for an associated primary secondary cell is satisfied; and if it is determined that the handover execution condition for the primary cell is satisfied but the execution condition for the associated primary secondary cell is not satisfied, the user equipment comprises means for enabling completion of conditional handover to the primary cell and means for postponing enabling completion of execution of the associated primary secondary cell for dual connectivity, wherein during postponing, the user equipment comprises means for maintaining the configuration of at least one configured primary secondary cell, means for performing measurements related to at least one of the maintained primary secondary cells, means for transmitting information related to the performed measurements towards the primary cell, and when receiving a trigger from the primary cell to access the associated primary secondary cell for which measurement information has been transmitted, the user equipment comprises means for accessing the associated primary secondary cell.

According to a second aspect, there is provided a user equipment comprising means for enabling conditional handover with delayed dual connectivity, and comprising at least one processor and at least one memory, said at least one memory stored with computer program code thereon, the at least one memory and the computer program code configured to, with the at least one processor, cause the user equipment at least to perform:

receiving configuration information comprising at least a handover execution condition for a primary cell and an execution condition for at least one primary secondary cell with delayed dual connectivity execution enabled;

determining whether the handover execution condition for the primary cell is satisfied and whether the execution condition for an associated primary secondary cell is satisfied; and if it is determined that the handover execution condition for the primary cell is satisfied but the execution condition for the associated primary secondary cell is not satisfied, enabling completion of conditional handover to the primary cell and postponing enabling completion of execution of the associated primary secondary cell for dual connectivity, wherein during postponing, maintaining the configuration of at least one configured primary secondary cell, performing measurements related to at least one of the maintained primary secondary cells, transmitting information related to the performed measurements towards the primary cell, and when receiving a trigger from the primary cell to access the associated primary secondary cell for which measurement information has been transmitted, accessing the associated primary secondary cell.

A method according to a third aspect discloses a method for enabling conditional handover with delayed dual connectivity, the method comprising:

receiving configuration information comprising at least a handover execution condition for a primary cell and an execution condition for at least one primary secondary cell with delayed dual connectivity execution enabled;

determining whether the handover execution condition for the primary cell is satisfied and whether the execution condition for an associated primary secondary cell is satisfied; and if it is determined that the handover execution condition for the primary cell is satisfied but the execution condition for the associated primary secondary cell is not satisfied, enabling completion of conditional handover to the primary cell and postponing enabling completion of execution of the associated primary secondary cell for dual connectivity, wherein during postponing, maintaining the configuration of at least one configured primary secondary cell, performing measurements related to at least one of the maintained primary secondary cells, transmitting information related to the performed measurements towards the primary cell, and when receiving a trigger from the primary cell to access the associated primary secondary cell for which measurement information has been transmitted, accessing the associated primary secondary cell.

A network node according to a fourth aspect discloses a target master node for a radio access network, the target master node comprising means for enabling conditional handover with delayed dual connectivity, the target master node comprising:

means for preparing configuration information comprising at least a handover execution condition for a primary cell and an execution condition for at least one primary secondary cell with delayed dual connectivity execution enabled, and means for sending the configuration information towards a user equipment;

if it is determined that the handover execution condition for the primary cell is satisfied but the execution condition for an associated primary secondary cell is not satisfied, the target master node comprises in response to received primary secondary cell related measurement results from the user equipment, means for deciding whether there is a chance for the execution condition for the associated primary secondary cell to be fulfilled in a predetermined time period; and if there is, the target master node comprises means for enabling completion of conditional handover to the primary cell and means for postponing enabling completion of execution of the associated primary secondary cell for dual connectivity, wherein during postponing, the target master node comprises means for maintaining the configuration of at least one configured primary secondary cell, means for receiving information related to performed measurements related to at least one of the maintained primary secondary cells, from the user equipment, means for requesting the user equipment to access the associated primary secondary cell for which measurement information has been received, by sending a trigger to the user equipment with respective means, and means for enabling the user equipment to access the associated primary secondary cell.

A network node according to a fifth aspect discloses a target master node for a radio access network, the target master node comprising means for enabling conditional handover with delayed dual connectivity, the target master node comprising at least one processor and at least one memory, said at least one memory stored with computer program code thereon, the at least one memory and the computer program code configured to, with the at least one processor, cause the target master node at least to perform:

preparing configuration information comprising at least a handover execution condition for a primary cell and an execution condition for at least one primary secondary cell with delayed dual connectivity execution enabled, and sending the configuration information towards a user equipment;

if it is determined that the handover execution condition for the primary cell is satisfied but the execution condition for an associated primary secondary cell is not satisfied, in response to received primary secondary cell related measurement results from the user equipment, deciding whether there is a chance for the execution condition for the associated primary secondary cell to be fulfilled in a predetermined time period; and if there is, enabling completion of conditional handover to the primary cell and postponing enabling completion of execution of the associated primary secondary cell for dual connectivity, wherein during postponing, maintaining the configuration of at least one configured primary secondary cell, receiving information related to performed measurements related to at least one of the maintained primary secondary cells, from the user equipment, requesting the user equipment to access the associated primary secondary cell for which measurement information has been received, by sending a trigger to the user equipment, and enabling the user equipment to access the associated primary secondary cell.

A method according to a sixth aspect discloses a method for enabling conditional handover with delayed dual connectivity, the method comprising:

preparing configuration information comprising at least a handover execution condition for a primary cell and an execution condition for at least one primary secondary cell with delayed dual connectivity execution enabled, and sending the configuration information towards a user equipment;

if it is determined that the handover execution condition for the primary cell is satisfied but the execution condition for an associated primary secondary cell is not satisfied, in response to received primary secondary cell related measurement results from the user equipment, deciding whether there is a chance for the execution condition for the associated primary secondary cell to be fulfilled in a predetermined time period; and if there is, enabling completion of conditional handover to the primary cell and postponing enabling completion of execution of the associated primary secondary cell for dual connectivity, wherein during postponing, maintaining the configuration of at least one configured primary secondary cell, receiving information related to performed measurements related to at least one of the maintained primary secondary cells, from the user equipment, requesting the user equipment to access the associated primary secondary cell for which measurement information has been received, by sending a trigger to the user equipment, and enabling the user equipment to access the associated primary secondary cell.

In an embodiment, in the step of postponing enabling completion of execution of the primary secondary cell for dual connectivity, the word "enabling" may be replaced by "supporting" or "triggering", so that any selected one of these three meanings can be applied, in respective three different embodiments. As the UE completes the handover in co-operation with the base station, the "enabling" may for instance comprise starting or triggering a RACH (i.e. Random Access Channel) procedure, or a RACHless access to switch to another base station.

Concerning the maintaining the configuration of at least one configured primary secondary cell, "maintaining" means that the UE applies the configuration and changes the modem parameters indicated in the configuration. Instead of maintaining, the configuration may also be applied, in an embodiment. The application of a configuration means that the current configuration is deleted, and the configuration is loaded in the necessary components, so that it is moved from the memory, and indicated to the related electronic components that will use this configuration. One example would be that the UE can store the target cell transmit power in memory, but if the UE needs to apply this transmit power the CPU needs to send this information to the baseband unit, and the baseband unit will configure this transmit power information to the power amplifier such that the transmit signals can be set at this value. And these components have requirements that only one transmit power can be configured at once, so if one "applies" the configuration, the other configuration is lost. Also, this application is not instantaneous, and this takes some time. So if one applies the configuration, one can start transmitting without any further delay. This will save tens of milliseconds of interruption time when UE is accessing the target PSCell after receiving the indication from the target MN, after waiting for the next PRACH occasion without further delay.

In an embodiment, the configuration of a PSCell associated with an applied PCell will be applied to enable fast handover, but other PSCells configurations may be maintained as well to enable handover to one of those, e.g. the PCell may be configured to be associated with two PSCells, and the configuration of the better one (e.g. the one with better measurement results) will be applied, and the other one is maintained.

Some embodiments within the first, second and third aspects are discussed next.

In an embodiment, obtaining information of the primary cell from a distributed unit of a master node.

In an embodiment, obtaining information of the primary secondary cell from a distributed unit of a secondary node.

In an embodiment, the information related to the performed measurements comprises a request to a target master node to check the execution condition for the primary secondary cell based on the performed measurement information and identification of a primary secondary cell fulfilling the execution condition. In an embodiment, the trigger from the primary cell to access a primary secondary cell is a Radio Resource Control-based variant, comprising:

receiving a modified Radio Resource Control Reconfiguration with sync message from a target master node distributed unit;

sending a Radio Resource Control Reconfiguration complete to the target master node distributed unit.

In an embodiment, the trigger from the primary cell to access a primary secondary cell is a physical downlink control channel order-based variant, comprising:

receiving a physical downlink control channel order from a target master node distributed unit.

In an embodiment, the trigger from the primary cell to access a primary secondary cell is a downlink medium access control control element-based variant, comprising:

receiving an access secondary node downlink medium access control control element from a target master node distributed unit.

In an embodiment, the trigger from the primary cell to access a primary secondary cell is based on at least one of the following: current amount of downlink data waiting for transmission to the user equipment, current resource availability at a master node, current resource availability at a secondary node.

In an embodiment, in case that at least two primary secondary cells have been identified fulfilling the respective execution condition, checking which primary secondary cell is best suited for dual connectivity, based on comparison of current load, and/or resource availability at the identified primary secondary cells.

In an embodiment, accessing the associated primary secondary cell using a random access channel (RACH) or RACHless procedure, where the RACHless procedure is selected in case timing advance of the associated primary secondary cell is known via an early sync procedure.

In an embodiment, instead of or in addition to maintaining the configuration of at least one configured primary secondary cell, applying the configuration of at least one configured primary secondary cell; and sending a confirmation of configuration application.

Some embodiments within the fourth, fifth and sixth aspects are discussed next.

In an embodiment, the received information related to the performed measurements comprises a request from the user equipment to check the execution condition for the primary secondary cell based on the performed measurement information and identification of a primary secondary cell fulfilling the execution condition.

In an embodiment, the trigger from the primary cell to access a primary secondary cell is a Radio Resource Control-based variant, comprising:

sending a Radio Resource Control Reconfiguration with sync message from a target master node centralized unit to a target master node distributed unit; sending a modified Radio Resource Control Reconfiguration with sync message from the target master node distributed unit to the user equipment; and receiving a Radio Resource Control Reconfiguration complete from the user equipment to the target master node distributed unit, and further forwarding the Radio Resource Control Reconfiguration complete to the target master node centralized unit.

In an embodiment, the trigger from the primary cell to access a primary secondary cell is a physical downlink control channel order-based variant, comprising:

sending a request to trigger user equipment synchronization to a target secondary node, from a target master node centralized unit to a target master node distributed unit;

sending a physical downlink control channel order from the target master node distributed unit to the user equipment; and sending a response message that the access request has been sent, from the target master node distributed unit to the target master node centralized unit.

In an embodiment, the trigger from the primary cell to access a primary secondary cell is a downlink medium access control control element-based variant, comprising:

sending a request to trigger user equipment synchronization to a target secondary node, from a target master node centralized unit to a target master node distributed unit;

sending an access secondary node downlink medium access control control element from the target master node distributed unit to the user equipment; and sending a response message that the access request has been sent, from the target master node distributed unit to the target master node centralized unit.

In an embodiment, the trigger from the primary cell to access a primary secondary cell is based on at least one of the following: current amount of downlink data waiting for transmission to the user equipment, current resource availability at a master node, current resource availability at a secondary node.

In an embodiment, in case that at least two primary secondary cells have been identified fulfilling the respective execution condition, checking which primary secondary cell is best suited for dual connectivity, based on comparison of current load, and/or resource availability at the identified primary secondary cells.

In an embodiment, requesting the user equipment to access the associated primary secondary cell using a random access channel (RACH) or RACHless procedure, where the RACHless procedure is selected in case timing advance of the associated primary secondary cell is known via an early sync procedure.

In an embodiment, instead of or in addition to maintaining the configuration of at least one configured primary secondary cell, applying the configuration of at least one configured primary secondary cell; and sending a confirmation of configuration application.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which:

FIG. 11*a* illustrates a flow chart for a method in view of a UE according to an embodiment;

FIG. 11*b* illustrates a flow chart for a method in view of a target Master Node according to an embodiment.

DETAILED DESCRIPTION OF SOME EXAMPLE EMBODIMENTS

The following describes in further detail suitable apparatus and possible mechanisms carrying out the operations for a conditional handover. While the following focuses on 5G networks, the embodiments as described further below are by no means limited to be implemented in said networks only, but they are applicable in any network supporting conditional handover.

Figure 1:
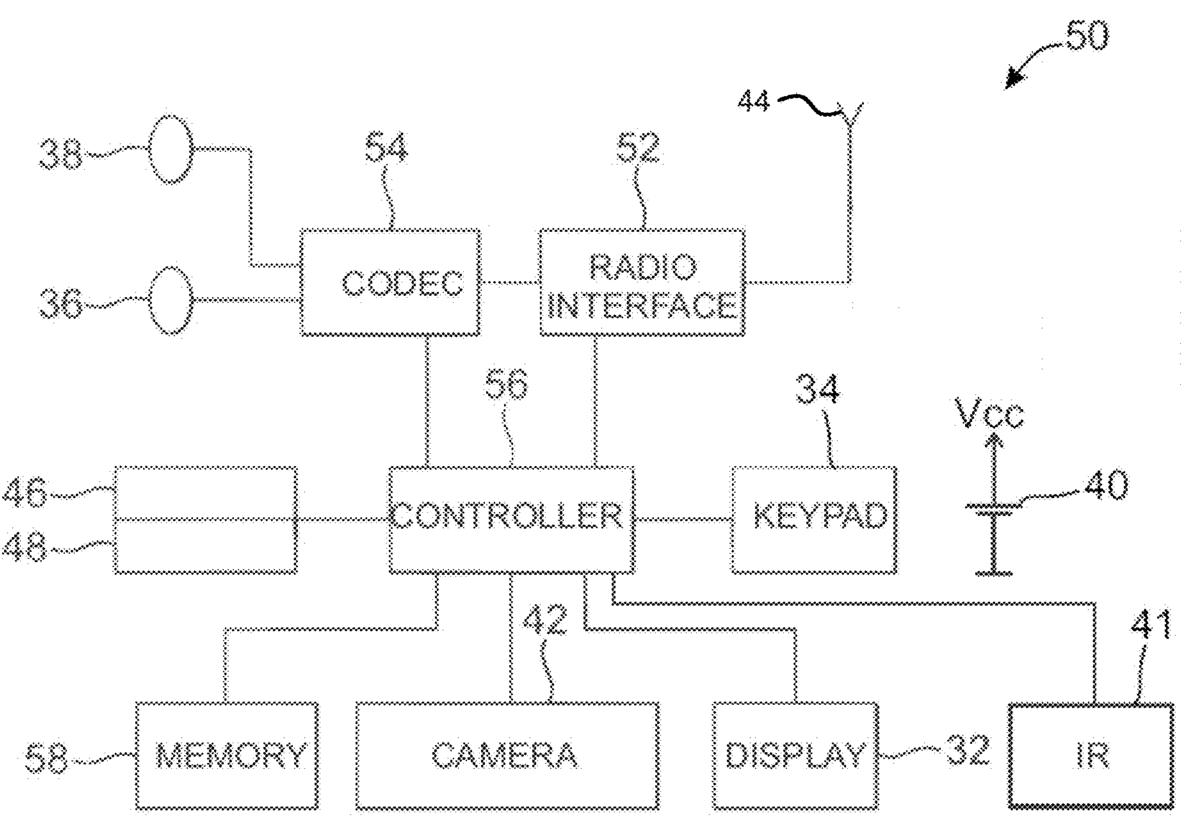
FIG. 1 illustrates schematic block diagram of a user equipment apparatus for incorporating functionalities for implementing various embodiments.
Figure 2:
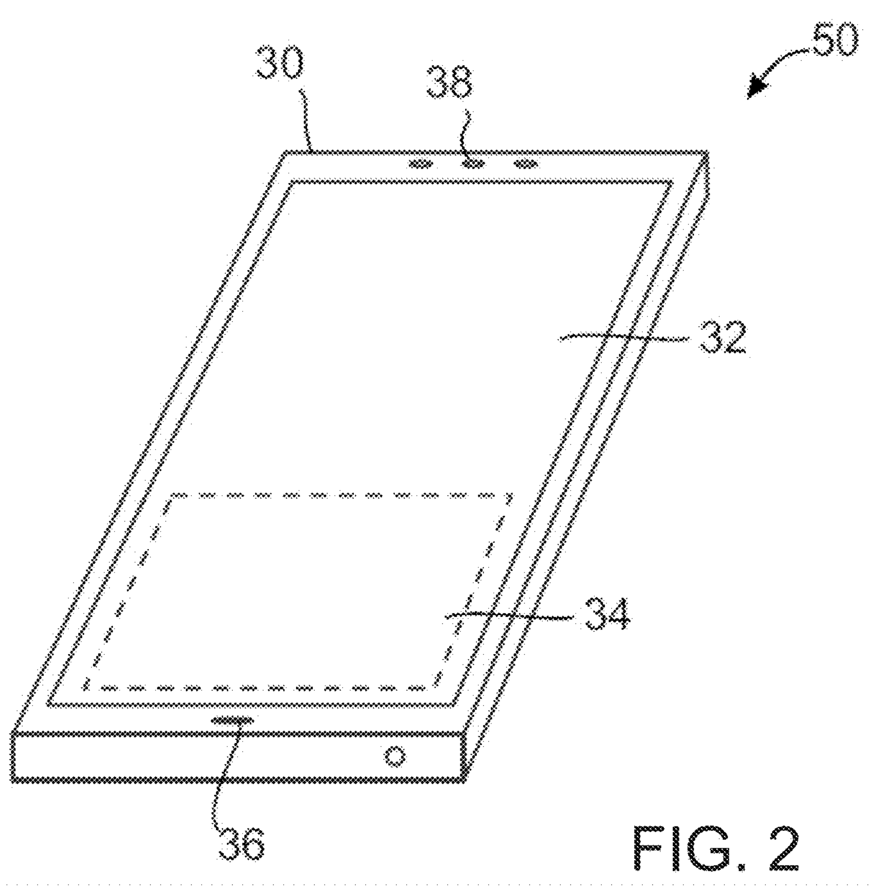
FIG. 2 illustrates schematically a layout of a user equipment apparatus according to an example embodiment.

In this regard, reference is first made to FIGS. 1 and 2, where FIG. 1 shows a schematic block diagram of an exemplary apparatus or electronic device 50, which may incorporate the arrangement according to the embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and a gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 3:
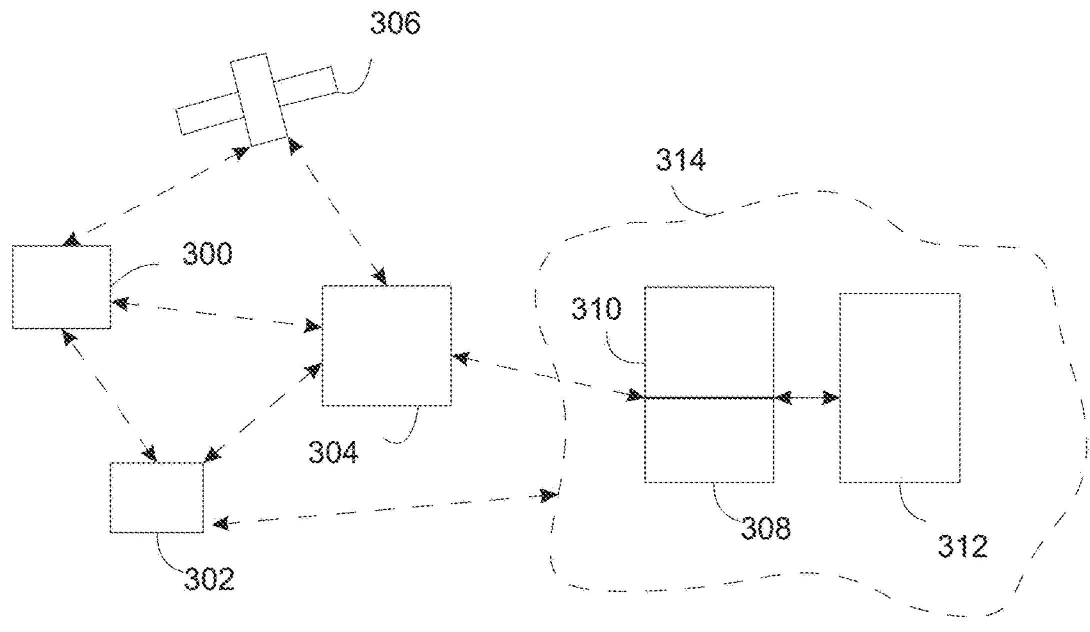
FIG. 3 illustrates a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as gNodeB) 304 providing the cell. The physical link from a user device to a gNodeB is called uplink or reverse link and the physical link from the gNodeB to the user device is called downlink or forward link. It should be appreciated that gNodeBs or their functionalities may be implemented by using any node (such as Integrated Access and Backhaul (IAB) node), host, server or access point etc. entity suitable for such a usage.

A communication system typically comprises more than one gNodeB in which case the gNodeBs may also be configured to communicate with one another over links, wired or wireless, designed for the purpose. These links may be used for signaling purposes. The gNodeB is a computing device configured to control the radio resources of the communication system it is coupled to. The gNodeB may also be referred to as a base station, an access point or any other type of interfacing device including a relay station capable of operating in a wireless environment. The gNodeB includes or is coupled to transceivers. From the transceivers of the gNodeB, a connection is provided to an antenna unit that establishes bi-directional radio links to user devices. The antenna unit may comprise a plurality of antennas or antenna elements. The gNodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

In 5G NR, the User Plane Function (UPF) may be used to separate the control plane and the user plane functions. Therein, the Packet Gateway (PGW) control and user plane functions may be decoupled, whereby the data forwarding component (PGW-U) may be decentralized, while the PGW-related signaling (PGW-C) remains in the core. This allows packet processing and traffic aggregation to be performed closer to the network edge, increasing bandwidth efficiencies while reducing network load.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/RX) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

The 4G/LTE networks support some multi-TRP schemes, but in 5G NR the multi-TRP features are enhanced e.g. via transmission of multiple control signals via multi-TRPs, which enables to improve link diversity gain. Moreover, high carrier frequencies (e.g., mmWaves) together with the Massive MIMO antennas require new beam management procedures for multi-TRP technology.

5G mobile communications support a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (interradio interface operability, such as below 6 GHz-cmWave, below 6 GHz-cm Wave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of gNodeBs, the user device may have access to a plurality of radio cells and the system may also comprise other apparatuses, such as physical layer relay nodes or other network elements, etc. At least one of the gNodeBs may be a Home gNodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or pico-cells. The gNodeBs of FIG. 1 may provide any kind of these cells. A cellular radio system may be implemented as a multilayer network including several kinds of cells. Typically, in multilayer networks, one access node provides one kind of a cell or cells, and thus a plurality of gNodeBs are required to provide such a network structure.

The Radio Resource Control (RRC) protocol is used in various wireless communication systems for defining the air interface between the UE and a base station, such as a gNB. This protocol is specified by 3GPP in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA_PCH (URA Paging Channel). The UE may communicate with the gNB via various logical channels like Broadcast Control Channel (BCCH), Paging Control Channel (PCCH), Common Control Channel (CCCH), Dedicated Control Channel (DCCH), and Dedicated Traffic Channel (DTCH).

The transitions between the states are controlled by a state machine of the RRC. When the UE is powered up, it is in a disconnected mode/idle mode. The UE may transit to RRC connected mode with an initial attach or with a connection establishment. If there is no activity from the UE for a short time, the gNB may suspend its session by moving to RRC Inactive mode and can resume its session by moving to RRC connected mode. The UE can move to the RRC idle mode from the RRC connected mode or from the RRC inactive mode.

The actual user and control data from the network to the UEs is transmitted via downlink physical channels, which in 5G include Physical downlink control channel (PDCCH) which carries the necessary downlink control information (DCI), Physical Downlink Shared Channel (PDSCH), which carries the user data and system information for the user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ (Hybrid Automatic Repeat reQuest) feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random-access.

The following description may provide further details of alternatives, modifications and variances: a gNB comprises e.g., a node providing NR user plane and control plane protocol terminations towards the UE, and connected via the NG interface to the 5GC, e.g., according to 3GPP TS 38.300 V16.6.0 (2021-06) section 3.2 incorporated by reference.

The gNB-CU comprises e.g., a logical node hosting e.g., RRC, SDAP and PDCP protocols of the gNB or RRC and PDCP protocols of the en-gNB that controls the operation of one or more gNB-DUs. The gNB-CU terminates the F1 interface connected with the gNB-DU.

The gNB-DU comprises e.g., a logical node hosting e.g., RLC, MAC and PHY layers of the gNB or en-gNB, and its operation is partly controlled by the gNB-CU. One gNB-DU supports one or multiple cells. One cell is supported by only one gNB-DU. The gNB-DU terminates the F1 interface connected with the gNB-CU.

The gNB-CU-CP comprises e.g., a logical node hosting e.g., the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU.

The gNB-CU-UP comprises e.g., a logical node hosting e.g., the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU, e.g., according to 3GPP TS 38.401 V16.6.0 (2021-07) section 3.1 incorporated by reference.

Different functional splits between the central and distributed unit are possible, e.g., called options:

Option 1 (1A-like split):

The function split in this option is similar to the 1A architecture in DC. RRC is in the central unit. PDCP, RLC, MAC, physical layer and RF are in the distributed unit.

Option 2 (3C-like split):

The function split in this option is similar to the 3C architecture in DC. RRC and PDCP are in the central unit. RLC, MAC, physical layer and RF are in the distributed unit.

Option 3 (intra RLC split):

Low RLC (partial function of RLC), MAC, physical layer and RF are in the distributed unit. PDCP and high RLC (the other partial function of RLC) are in the central unit.

Option 4 (RLC-MAC split):

MAC, physical layer and RF are in the distributed unit. PDCP and RLC are in the central unit.

Or else, e.g., according to 3GPP TR 38.801 V14.0.0 (2017-03) section 11 incorporated by reference.

A gNB supports different protocol layers, e.g., Layer 1 (L1)-physical layer.

The layer 2 (L2) of NR is split into the following sublayers: Medium Access Control (MAC), Radio Link Control (RLC), Packet Data Convergence Protocol (PDCP) and Service Data Adaptation Protocol (SDAP), where e.g.:

The physical layer offers to the MAC sublayer transport channels;

The MAC sublayer offers to the RLC sublayer logical channels;

The RLC sublayer offers to the PDCP sublayer RLC channels;

The PDCP sublayer offers to the SDAP sublayer radio bearers;

The SDAP sublayer offers to 5GC QoS flows;

Comp. refers to header compression and Segm. To segmentation;

Control channels include (BCCH, PCCH).

Layer 3 (L3) includes e.g., Radio Resource Control (RRC), e.g., according to 3GPP TS 38.300 V16.6.0 (2021-06) section 6 incorporated by reference.

A Radio Access Network (RAN) node or network node like e.g. a gNB, base station, gNB CU or gNB DU or parts thereof may be implemented using e.g. an apparatus with at least one processor and/or at least one memory (with computer-readable instructions (computer program)) configured to support and/or provision and/or process CU and/or DU related functionality and/or features, and/or at least one protocol (sub-) layer of a RAN (Radio Access Network), e.g. layer 2 and/or layer 3.

The gNB CU and gNB DU parts may e.g., be co-located or physically separated. The gNB CU may include two parts a CU-CP and a CU-UP part. The CU-CP part may even be split, e.g. in a first CP part located at the CU, and a second CP part located at the DU. This first and second CP part may perform different RRC operations and processing, e.g. central and local operations, respectively, or overlapping operations which may need coordination. The gNB DU may even be split further, e.g., into two parts, e.g., one including processing equipment and one including an antenna. A Central Unit (CU) may also be called BBU/REC/RCC/C-RAN/V-RAN, O-RAN, or part thereof. A Distributed Unit (DU) may also be called RRH/RRU/RE/RU, or part thereof. Hereinafter, in various example embodiments of the present disclosure, the CU-CP (or more generically, the CU) may also be referred to as a (first) network node that supports at least one of central unit control plane functionality or a layer 3 protocol of a radio access network; and similarly, the DU may be referred to as a (second) network node that supports at least one of distributed unit functionality or the layer 2 protocol of the radio access network.

A gNB-DU supports one or multiple cells, and could thus serve as e.g., a serving cell for a user equipment (UE).

A user equipment (UE) may include a wireless or mobile device, an apparatus with a radio interface to interact with a RAN (Radio Access Network), a smartphone, an in-vehicle apparatus, an IoT device, a M2M device, or else. Such UE or apparatus may comprise: at least one processor; and at least one memory including computer program code; wherein the at least one memory and the computer program code are configured to, with the at least one processor, cause the apparatus at least to perform certain operations, like e.g. RRC connection to the RAN. A UE is e.g., configured to generate a message (e.g., including a cell ID) to be transmitted via radio towards a RAN (e.g., to reach and communicate with a serving cell). A UE may generate and transmit and receive RRC messages containing one or more RRC PDUs (Packet Data Units).

The UE may have different states (e.g., according to 3GPP TS 38.331 V16.5.0 (2021-06) sections 42.1 and 4.4, incorporated by reference).

A UE is e.g., either in RRC_CONNECTED state or in RRC_INACTIVE state when an RRC connection has been established.

In RRC_CONNECTED state a UE may:
- store the AS context;
- transfer unicast data to/from the UE;
- monitor control channels associated with the shared data channel to determine if data is scheduled for the data channel;
- provide channel quality and feedback information;
- perform neighboring cell measurements and measurement reporting.

The RRC protocol includes e.g. the following main functions:
- RRC connection control;
- measurement configuration and reporting;
- establishment/modification/release of measurement configuration (e.g. intra-frequency, inter-frequency and inter-RAT measurements);
- setup and release of measurement gaps;
- measurement reporting.

Dual Connectivity (DC) is a feature supported in LTE and in 5G NR enabling aggregation of two radio links at the PDCP (Packet Data Convergence Protocol) layer level. For resource aggregation, a UE in RRC_CONNECTED state is allocated two radio links from two different network nodes that may be connected via a non-ideal backhaul. The first node, Master Node (MN), serves as mobility and signaling anchor and the second node, Secondary Node (SN), provides additional local radio resources for the UE. The two resource sets are called as Master Cell Group (MCG, associated with MN) and Secondary Cell Group (SCG, associated with SN). The MN can be either LTE eNB or NR gNB. The SN can be either LTE eNB or NR gNB. The MN and the SN can be the same node.

Dual Connectivity can improve user throughput and mobility robustness, since the users may be connected simultaneously to MCG and SCG, as well as improve load balancing between MCG and SCG resources.

The CHO has been specified for UEs configured with use of Dual Connectivity. Herein, the source MN node (controlling Primary Cell, PCell) sends a handover request to the target MN node (controlling target PCell) which in turn selects a secondary node (controlling target PSCell) and prepares it as part of the CHO preparation. When the CHO execution condition is met, the UE performs access to the target PCell and PSCell.

A conditional handover (CHO) is a feature supported in LTE and in 5G NR. The CHO resembles in many aspects the previously known "ordinary" handover (HO), i.e. the legacy HO. The process according to the present invention is discussed next, with its various embodiments.

Figure 4:
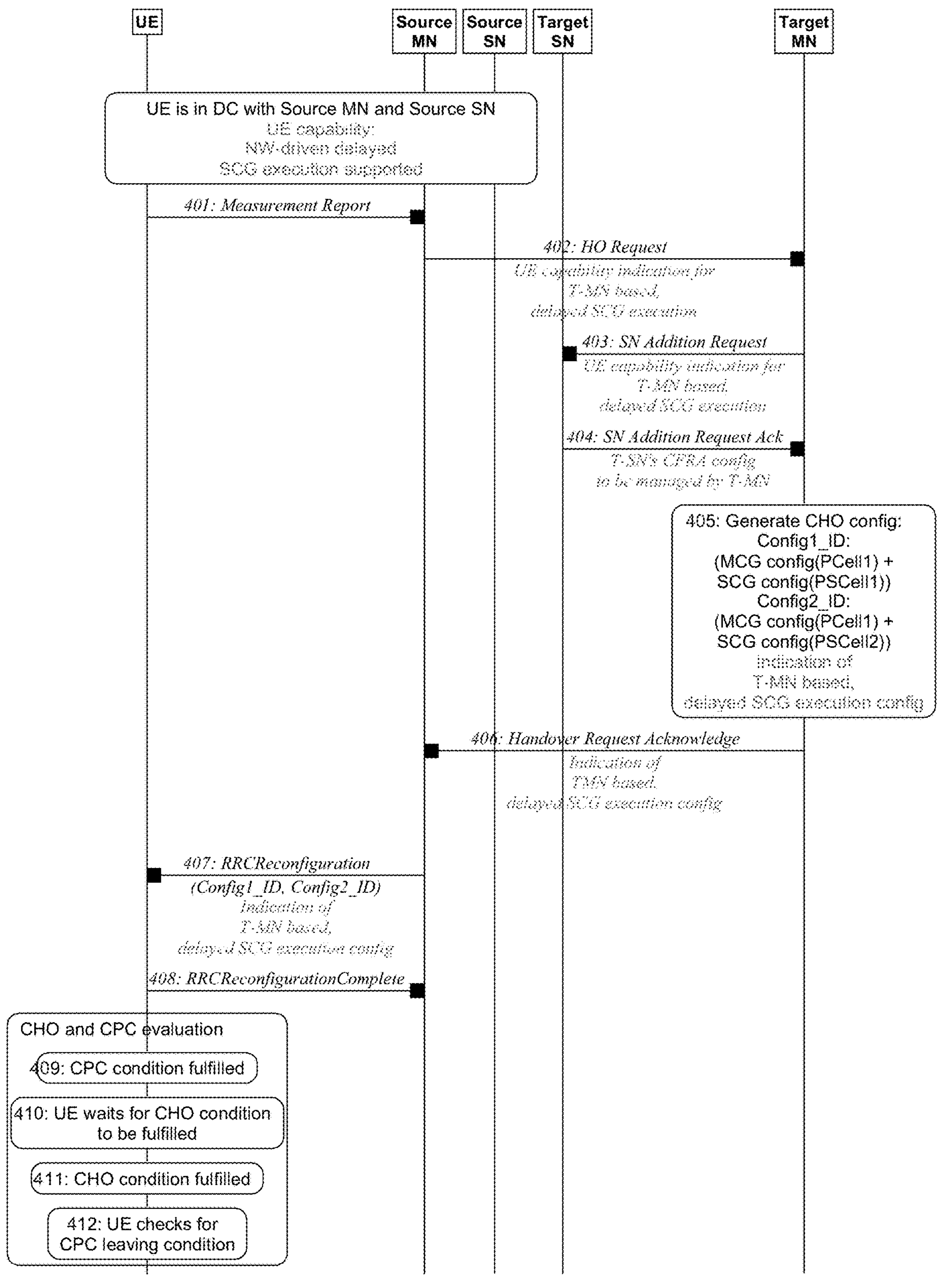
FIG. 4 illustrates a process chart illustrating a mobility preparation and evaluation part of the present invention.

FIG. 4 illustrates a process chart illustrating a mobility preparation and evaluation part of the present invention. This forms an embodiment of the present invention. All the black squares in this and the following process charts mean an arrow which points to the network element marked with the black square, respectively.

Structurally, the following embodiments are organized to follow existing CHO with CPC/CPA phases. First part of the description is related to mobility preparation and evaluation phases (as in the embodiment according to FIG. 4). Second part is related to mobility execution and completion phases (as in the embodiments according to FIGS. 5-7). The complete message flow diagram is divided into several parts for better readability (numbering of message flow diagram steps is kept consistent throughout all diagrams). However, it is emphasized that the scope of protection is determined by the independent claims; the complete message flow diagram as in FIGS. 4-7 as combined illustrate also various detailed embodiments around the main inventive concept. In other words, independent claims define the essential features of this invention, while FIGS. 4-7 also involve detailed features part of different embodiments under the main inventive concept.

In an embodiment of the invention, the mobility preparation and evaluation part of the invention comprises the following steps, involving the following twelve consecutive actions/features, numbered as steps 401-412.

The elements which are involved here are the User Equipment (UE), the Source Master Node (Source MN), the Source Secondary Node (Source SN), the Target Secondary Node (Target SN), and the Target Master Node (Target MN).

The UE is here in Dual Connectivity (DC) with the Source MN and the Source SN. The UE also has a capability to support network-driven delayed Secondary Cell Group (SCG) execution/activation.

In step 401 of the mobility preparation and evaluation diagram according to FIG. 4, a measurement report is transmitted from the UE to the Source MN.

In step 402, the Source MN transmits a handover (HO) request to the Target MN. More precisely, in an embodiment, the handover request is a request for conditional handover (CHO) with conditional primary secondary cell change (CPC) and/or conditional primary secondary cell addition configuration (CPAC). It indicates that the UE is capable to use target MN-based and delayed Secondary Cell Group (SCG) execution.

In the next step, i.e. in step 403, a Secondary Node (SN) addition request is transmitted from the Target MN to the Target SN. In other words, the Target MN requests for CPC/CPAC configuration from the Target SN. This request also comprises the UE capability indication for the Target MN-based and delayed SCG execution.

In step 404, a Secondary Node addition request acknowledgment is sent back from the Target SN to the Target MN. In other words, the Target SN delivers CPC/CPAC configuration to the Target MN. In case when the Target SN agrees for contention free random access (CFRA) for Primary Cell for the Secondary Cell Group, it provides on per PSCell basis the following three matters, in an embodiment:

a. Full mapping between synchronization signal block (SSB) (and/or channel status information reference signal (CSI-RS)) indices and physical random access channel (PRACH) occasions to allow target MN to trigger random access in the right way.
b. L3 (i.e. 3GPP 5G RAN Layer 3) measurement objects' information to allow the Target MN to determine SSB (and/or CSI-RS) index based on received L3 measurement. Mapping of "measId" into "index" may also be performed. It should be noted that this step b) is needed if and only if measurements are defined by the Target SN and the Target MN is unaware of the measurements.
c. Dedicated preamble(s) (on per SSB index).

In step 405, the Target MN prepares CHO configuration with CPC/CPA to be sent to the Source MN and to the UE through the Source MN. Configuration for the UE shall contain indication that Target MN-driven, delayed SCG execution is possible (on per PSCell basis) and CPC leaving conditions as well, in an embodiment. Two configurations are determined: Configuration 1 is determined as Master Cell Group (MCG) configuration at Primary Cell 1+Secondary Cell Group (SCG) configuration at Primary Secondary Cell 1. Configuration 2 is determined as Master Cell Group (MCG) configuration at Primary Cell 1+Secondary Cell Group (SCG) configuration at Primary Secondary Cell 2. These configurations may be abbreviated as Config1_ID and Config2_ID.

In step 406, the configuration with solution-specific content is delivered from the Target MN to the Source MN. In other words, step 406 is a Handover Request Acknowledge message, comprising also an indication of Target MN-based and delayed SCG execution configuration.

In step 407, the configuration with solution-specific content is delivered from the Source MN to the UE. In other words, step 407 is a Radio Resource Control Reconfiguration message involving also Config1_ID and Config2_ID, comprising also an indication of Target MN-based and delayed SCG execution configuration.

Then in step 408, the UE informs the Source MN that the RRC Reconfiguration is complete.

In steps 409-412, the conditional handover (CHO) and the conditional primary secondary cell change (CPC) evaluation is performed in the UE. In step 409, the CPC condition is noted to be fulfilled. In step 410, the UE waits for the CHO condition to be fulfilled. Then in step 411, the CHO condition is noted to be fulfilled. Concerning all steps 409-411 concerning the part of CHO and CPC evaluation phase, the CPC conditions are met earlier than the CHO conditions.

In step 412, the UE checks for CPC leaving conditions. In other words, the UE goes back to the CPC conditions verification; and checks for CPC leaving conditions for the CPC conditions which were already fulfilled in step 409.

This concludes the embodiment describing the mobility preparation and evaluation steps of the invention.

Figure 5:
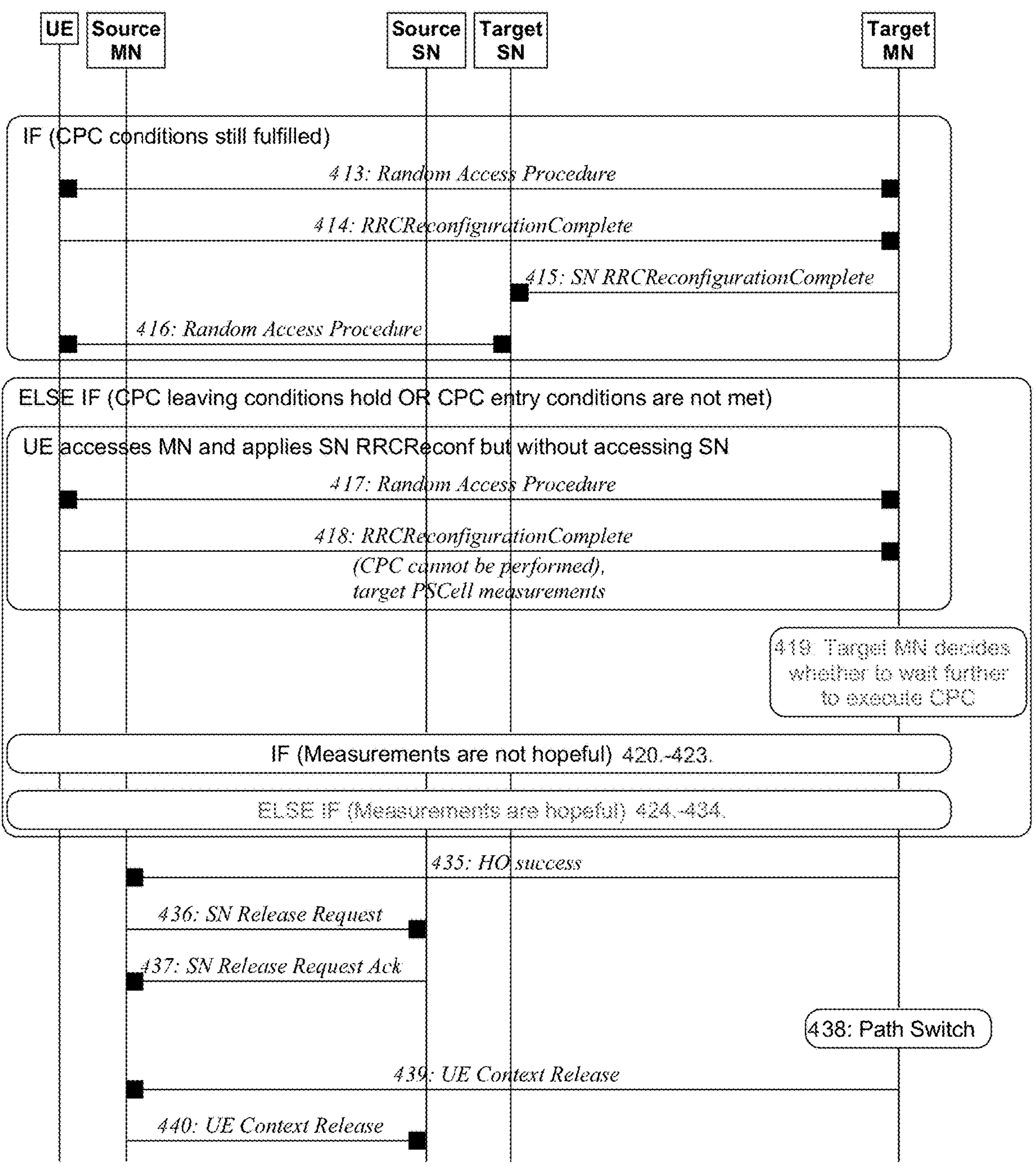
FIG. 5 illustrates a process chart illustrating mobility execution and evaluation part, comprising a main part of the procedure.

Next, we proceed to mobility execution and evaluation according to FIG. 5.

FIG. 5 has been called as a main part of the procedure, involving steps 413-440, but it is stressed that the scope of protection is determined by appended independent claims, with various embodiments being specified in respective dependent claims.

If the CPC conditions are still fulfilled, and the CPC leaving conditions are not met, the conditional handover with CPC is performed normally, i.e. steps 413-416 are performed consecutively. In step 413, Random Access Procedure is performed between the UE and the Target MN. Then in step 414, the UE informs the Target MN that the RRC Reconfiguration is complete. Then in step 415, the Target MN informs the Target SN that the Secondary Node RRC Reconfiguration is complete. Then in step 416, Random Access Procedure is performed between the UE and the Target SN.

Otherwise, if the CPC leaving conditions hold or CPC entry conditions are not met, the UE accesses MN and applies SN RRC Reconfiguration but without accessing the SN. In this situation, in step 417, the UE performs Random Access Procedure with the Target MN. Then in step 418, the UE informs the Target MN that the RRC Reconfiguration is complete. In this situation, the CPC cannot be performed, and this information is indicated in the message of step 418. In addition, the set of PSCell-related measurements are comprised in the message of step 418.

Then the process goes to step 419, where the Target MN decides whether to wait further to execute CPC. In other words, the target MN decides based on PSCell measurements delivered by the UE, whether there is any chance that CPC conditions will be met soon.

Then the process goes to steps 420-423 which describe the procedure for the case when there is no chance for CPC (the conditional Primary Secondary Cell change). In other words, the steps 420-423 are performed if measurements are not hopeful at all. These steps are described in a next subsection described in FIG. 6; "Fallback to legacy behavior".

Otherwise, if measurements are somehow hopeful, steps 424-434 are performed. In other words, steps 424-434 describe the procedure for the case when there is a chance for CPC. These steps are described in another subsection named as "Core part of the invention", described in FIG. 7. It is however stressed once more that the scope of the invention is determined by the independent claims.

This concludes the part where the CPC leaving conditions hold or CPC entry conditions are not met.

Next, in steps 435-440, the conditional handover with CPC is completed. This starts by the Target MN sending a Handover success message to the Source MN in step 435.

Then, the Source MN sends a Secondary Node Release Request to the Source SN in step 436. As a response, the Source SN sends an Secondary Node Release Request acknowledgment message 437 to the Source MN. Then, a path switch is performed in the Target MN in step 438. Then in step 439, the Target MN sends a UE Context Release message to the Source MN. Finally, in step 440, the Source MN sends a UE Context Release message to the Source SN.

This concludes the main part of the procedure, in an embodiment of the invention.

Figure 6:
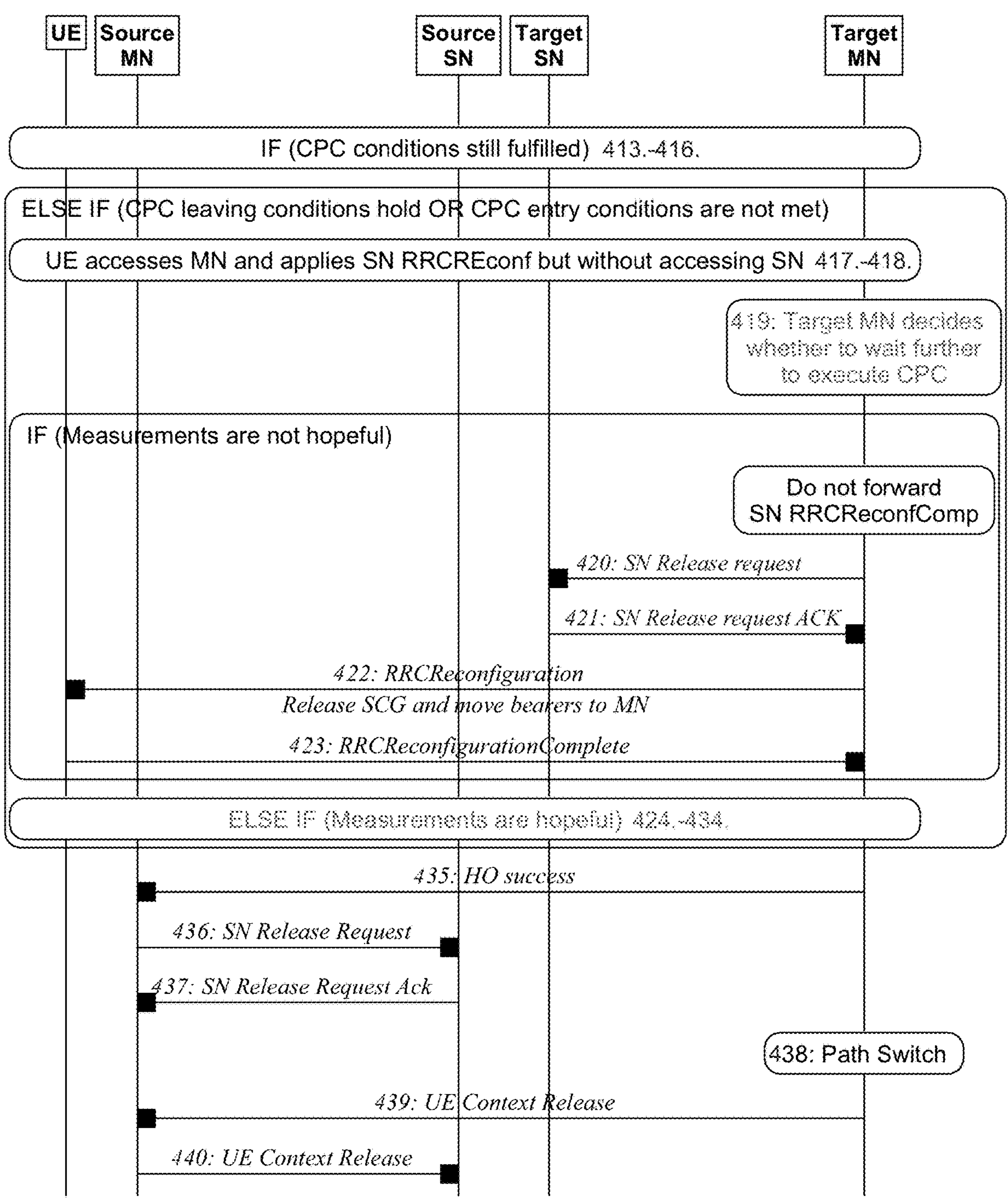
FIG. 6 illustrates a process chart illustrating fallback to legacy behavior.

FIG. 6 illustrates a process chart illustrating fallback to legacy behavior, in an embodiment of the invention.

This process chart covers a part of the message flow describing the steps relevant in a situation when, from the Target Master Node (MN) perspective (as in step 419), there is no chance for a successful CPC completion i.e. the measurements are not hopeful. The fallback to legacy behavior embodiment comprises steps 420-423 discussed in the following.

Steps 401-412 and 413-419 are in this embodiment the same as disclosed already in the above.

At first, the Target MN is configured to not forward the Secondary Node-specific Radio Resource Control Reconfiguration Complete message.

Next, in step 420, the Target MN transmits a SN Release request to the Target SN. As a response, in step 421, the Target SN transmits a SN Release request acknowledgment (ACK) back to the Target MN. Hence, with steps 420-421, the Target MN releases the Target SN.

Next, in step 422, the Target MN transmits a RRC Reconfiguration message to the UE. The Target MN hence reconfigures the UE to drop Dual Connectivity, and also the Secondary Cell Group (SCG) is released and Data Radio Bearers (DRBs) are moved to the Master Node. In step 423, an RRC Reconfiguration Complete message is transmitted back from the UE to the Target MN.

The steps of 424-434 are described in the following subsection (see also FIG. 7).

Steps 435-440 are performed similarly as already disclosed above.

Figure 7:
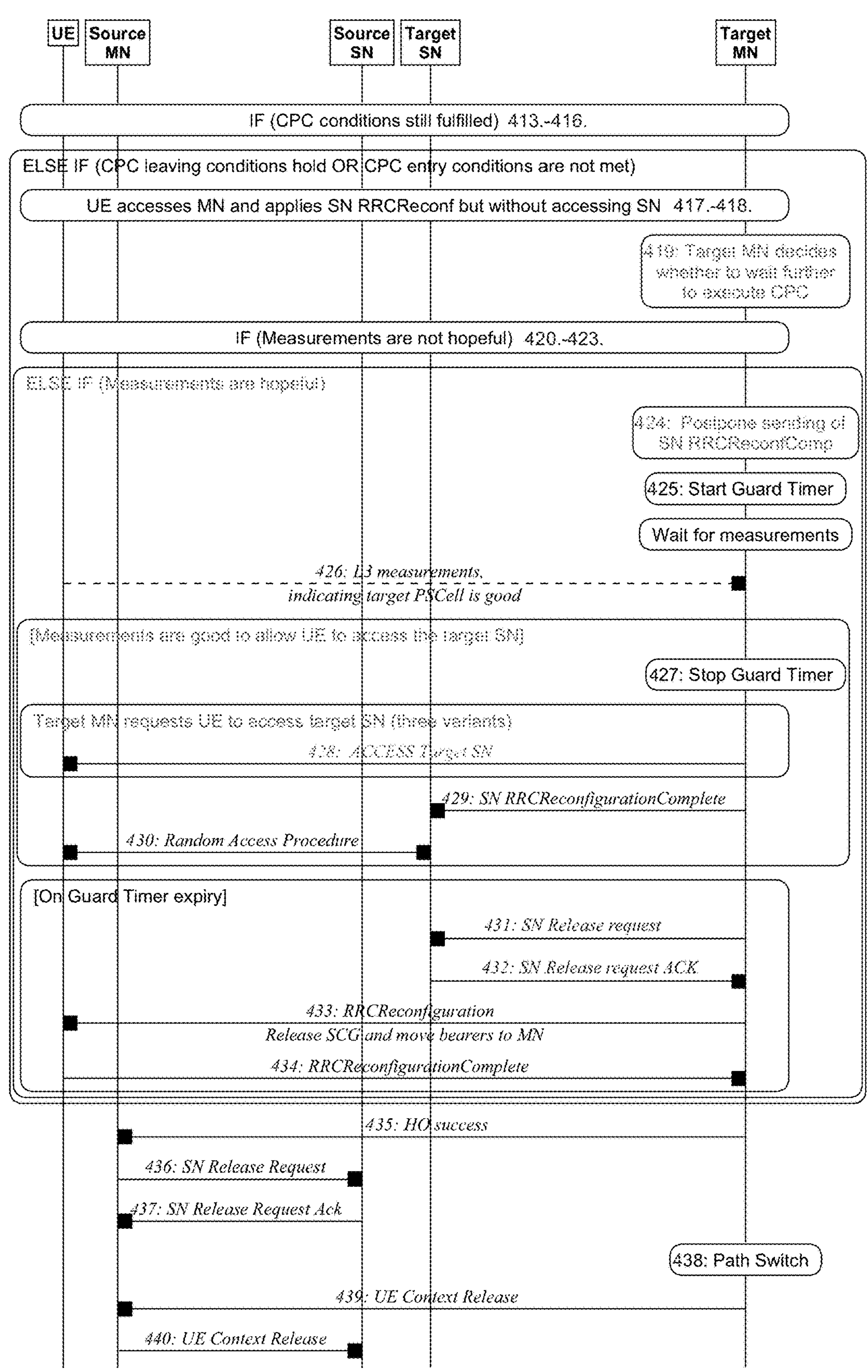
FIG. 7 illustrates a process chart illustrating a core part of the invention numbered as steps 424-434.

FIG. 7 illustrates a process chart illustrating a core part of the invention numbered as steps 424-434.

This subsection covers a part of the message flow describing the steps relevant in a situation when, from the Target Master Node perspective (as in step 419), there is a chance for a successful CPC completion. It describes steps 424-434, in an embodiment of the invention.

Steps 401-423 are performed as already disclosed in the above, in connection with the "main part of the procedure" and the "fallback to legacy behavior".

At first, the Target MN postpones sending of the Secondary Node-specific Radio Resource Control Reconfiguration Complete message, in step 424.

In the next step 425, the Target MN starts a Guard Timer, and the Target MN starts waiting for Primary Secondary Cell-related measurements from the UE.

In step 426 marked as a dashed line in FIG. 7, the UE sends the Primary Secondary Cell related measurements, and these results are received by the Target MN. In other words, these measurement results are L3 (i.e. 3GPP 5G RAN Layer 3) measurement results, and the purpose is to indicate whether the target Primary Secondary Cell is good or not.

When the measurement results meet the CPC conditions, or in other words, when the measurement results are good to allow the UE to access the target SN, the Guard Timer is stopped by the Target MN in step 427.

Thereafter, in step 428, the Target MN triggers the UE to synchronize with the Target SN. In other words, the Target MN requests the UE to access the Target SN. In various embodiments of the invention, there are three different variants of triggering the SN access, described in a section later in connection with FIGS. 8, 9 and 10.

After the step 428, in step 429, the SN-specific RRC Reconfiguration Complete message is sent from the Target MN to the Target SN.

In step 430, the UE performs a Random Access procedure on the Target SN.

This concludes the sub-process (i.e. steps 427-430), after the measurement results have been confirmed as good measurement results.

Next the process concentrates to the Guard Timer. When the Guard Timer expires at the Target MN after a predetermined time period, meaning that subsequent PSCell measurement results were never good enough for the process to proceed with step 428, then steps 431-434 are performed. In step 431, the Target MN transmits a Secondary Node Release Request to the Target SN. In response, the Target SN sends an Secondary Node Release Request ACK back to the Target MN in step 432. In other words, the Target SN is released.

In step 433, the Target MN transmits an RRC Reconfiguration request/message to the UE. Hence, the UE is reconfigured to drop Dual Connectivity, and also the Secondary Cell Group (SCG) is released and Data Radio Bearers (DRBs) are moved to the Master Node. In step 434, an RRC Reconfiguration Complete message is transmitted back from the UE to the Target MN. This concludes the actions made on Guard Timer expiry, in an embodiment of the invention.

Steps 435-440 may be performed as already described earlier in the "main part of the procedure", in this embodiment of the invention.

Figure 8:
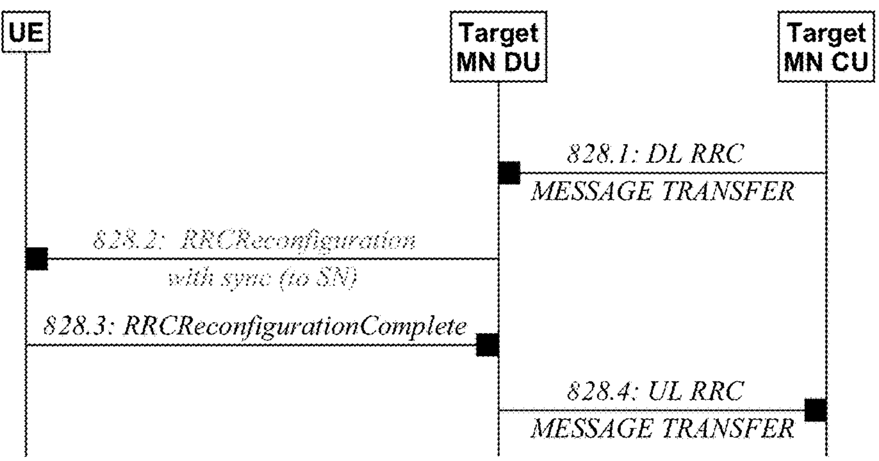
FIG. 8 illustrates a radio resource control-based access target secondary node trigger, in an embodiment of the invention.
Figure 9:
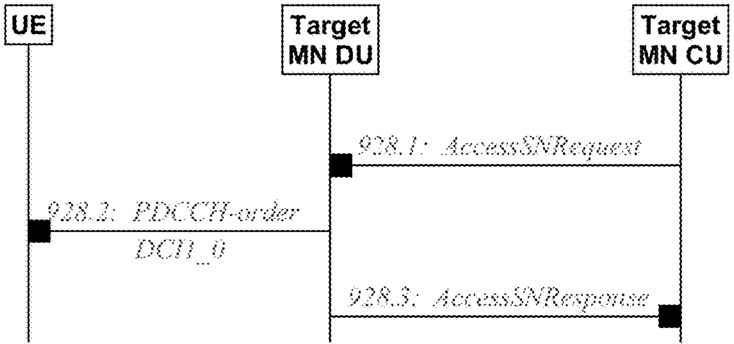
FIG. 9 illustrates physical downlink control channel-order based access target secondary node trigger, in an embodiment of the invention.
Figure 10:
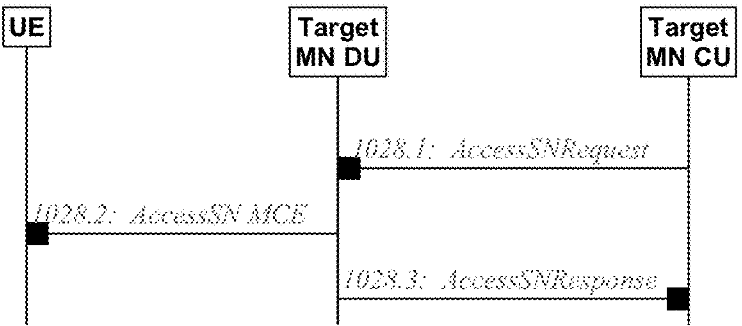
FIG. 10 illustrates a downlink MAC control element-based access target secondary node trigger, in an embodiment of the invention.

Next, FIGS. 8-10 are referred to, and three variants of triggering the Secondary Node access are described in connection with earlier determined step 428. These variants represent three different embodiments according to the present invention. These embodiments are described in the following. Each of the variants is meant to be performed in place of the earlier described step 428.

Based on measurements (meaning: measurement results) delivered by the UE in step 426, the Target MN, in step 428, requests the UE to synchronize with the Primary Secondary Cell (i.e. PSCell). Hence, in the present invention, there are disclosed three variants of how the UE can be triggered by the Target MN to access the PSCell. These variants are described in this subsection as follows.

The first variant is an RRC-based variant (RRC: Radio Resource Control). FIG. 8 is here referred to. The shown elements are the UE, a Target Master Node Distributed Unit (i.e. a Target MN DU) and a Target Master Node Centralized Unit (i.e. a Target MN CU).

In step 828.1, the Target MN CU sends an RRC Reconfiguration message with a sync message to the Target MN DU, which RRC Reconfiguration message is a modified version of an RRC Reconfiguration message with sync used during a Secondary gNB (i.e. 5G base station) addition. In brief, this can be called as a Downlink RRC message transfer in step 828.1.

Next, in step 828.2, the modified RRC Reconfiguration message with the sync message is sent from the Target MN DU to the UE. It should be noted that the Target MN DU requests the UE to synchronize to the Target SN (identified either by PCI (i.e. Physical Cell ID) or cellIdentity or conditional configuration index/id) and provides Random Access parameters related to the PSCell (hence, both Contention Based Random Access (CBRA) and Contention Free Random Access (CFRA) are possible). The remaining part of configuration is taken from PSCell-specific conditional configuration delivered to the UE in step 407 (see above), in an embodiment.

In step 828.3, the UE sends a RRC Reconfiguration Complete message back to the Target MN DU.

In step 828.4, the Target MN DU forwards the RRC Reconfiguration Complete message to the Target MN CU. In brief, this can be called as an Uplink RRC message transfer in step 828.4.

Steps 828.1-828.4 replace the earlier disclosed step 428, in this embodiment.

This concludes the first variant, which forms the embodiment of the RRC-based Access Target Secondary Node trigger.

Proceeding now to a second variant, it is a Physical Downlink Control Channel—order based variant (i.e. PDCCH). FIG. 9 is referred to, when describing this embodiment.

In step 928.1, the Target MN CU sends a request to the Target MN DU to trigger UE synchronization to the Target Secondary Node (i.e. an "AccessSNRequest" message). It should be noted that all needed Random Access parameters shall be provided (i.e. the ones needed to perform PDCCH ordered CFRA) in this situation. In addition, PSCell index is populated (in a useful embodiment: 0-based index of PSCell-related conditional configuration related to this Primary Cell) in this embodiment.

In step 928.2, the Target MN DU sends a PDCCH order to trigger an access for a SN. It uses information sent by the Target MN CU in step 928.1. The message "DCI1_0" is modified in such a way in an embodiment that 4 reserved bits out of existing 10-12 reserved bits in the tail of DCI1_0, as defined in 3GPP Technical Specification 38.212; section 7.3.1.2.1, create new field PSCell index. If the field is set to all ones, this is a regular PDCCH order, otherwise it is an Access SN trigger.

In step 928.3, the Target MN DU informs the Target MN CU that the access request has been sent. The message here is named as "AccessSNResponse".

Steps 928.1-928.3 replace the earlier disclosed step 428, in this embodiment.

This concludes the second variant, which forms the embodiment of the PDCCH-order based Access Target Secondary Node trigger.

Proceeding now to a third variant, it is a Downlink MAC (Medium Access Control) Control Element based variant (i.e. DL MCE). FIG. 10 is referred to, when describing this embodiment.

In step 1028.1, the Target MN CU sends a request to the Target MN DU to trigger UE synchronization to the Target SN. This can be called as an "AccessSNRequest". It should be noted that all needed Random Access parameters shall be provided (the ones needed to perform PDCCH ordered CFRA) since, in this third variant/embodiment, an Access SN MCE plays the same role as a PDCCH order. In addition, PSCell index is populated (in a useful embodiment: 0-based index of PSCell-related conditional configuration related to this Primary Cell) in this embodiment.

In step 1028.2, the Target MN DU sends an Access SN DL MCE to the UE. It is to be noted that, for example, the Access SN DL MCE consists of a standard MAC sub-PDU (Packet Data Unit) header (new DL MCE Logical Channel ID is needed) and the following (consistently with 3GPP TS 38.212, section 7.3.1.2.1):

OCTET 1:6 bits Random Access Preamble ID (RAPID), 1 bit Reserved, 1 bit Uplink/Supplementary Uplink (i.e. UL/SUL) indicator.

OCTET 2:6 bits Synchronization Signal/Physical Broadcast Channel (i.e. SS/PBCH) index, 2 bits Reserved.

OCTET 3:4 bits Physical Random Access Channel (i.e. PRACH) Mask Index, 4 bits PSCell index.

OCTETS can be defined in whatever way in this embodiment. 21 bits are needed to follow the PDCCH-order DCI1_0 structure.

In step 1028.3, the Target MN DU informs the Target MN CU that an access request has been sent (HARQ confirmed; Hybrid Automatic Repeat reQuest). The message here is named as "AccessSNResponse".

Steps 1028.1-1028.3 replace the earlier disclosed step 428, in this embodiment.

This concludes the third variant, which forms the embodiment of the DL MCE based Access Target Secondary Node trigger.

Advantages of the present invention are as follows. Enhancement can be reached with the present invention with regards to how the Target MN triggers the UE to access the Target SN. It would be beneficial in the cases when step 428 is realized using either PDCCH-order (steps 928.1-3) or DL MCE (steps 1028.1-3). Firstly, the UE and the Target MN DU shall be delivered with L1/L2 measurements' configuration (CPC part) in step 407. Secondly, in step 426, L1/L2 measurements could be delivered to the Target MN DU (instead of L3 measurements). Thirdly, the Target MN DU decides on triggering an access to a certain Primary Secondary Cell.

The advantages here are that F1 Application Protocol communication can be avoided in step 426, and in step 428 the UE can be triggered to access the target SN quicker (without involving the Radio Resource Control).

A further advantage of the present invention is that in prior art methods, the UE needs to receive "RRCReconfiguration", which is a big message. In the invention, the UE applies the target PSCell configuration and waits for the network to send a random access trigger. This is a lot leaner and faster than the UE receiving the RRCReconfiguration, which it has to decode (10 ms to decode the RRC from source, 10 ms to decode the target cell configuration). Therefore, it can be concluded that the process according to the invention is much faster than the ones applied in prior art.

A related further advantage of the present invention is that the UE implementation becomes less complex when the RRCReconfiguration reception can be avoided in the UE.

A method for conditional handover will be described with reference to the flow diagrams of FIGS. 11*a* and 11*b*, in accordance with respective embodiments of the present invention.

The flow diagram of FIG. 11*a* reflects the operation of a UE, and the flow diagram of FIG. 11*b* reflects the operation of a target Master Node, such as a gNB.

Hence, FIG. 11*a* illustrates a flow chart for a method in view of a UE according to an embodiment.

At the UE, the method comprises receiving (110) configuration information comprising at least a handover execution condition for a primary cell and an execution condition for at least one primary secondary cell with delayed dual connectivity execution enabled; determining (112) whether the handover execution condition for the primary cell is satisfied and whether the execution condition for an associated primary secondary cell is satisfied; if it is determined (114) that the handover execution condition for the primary cell is satisfied but the execution condition for the associated primary secondary cell is not satisfied; enabling (116) completion of conditional handover to the primary cell and postponing enabling completion of execution of the associated primary secondary cell for dual connectivity; wherein during postponing (118); maintaining (120) the configuration of at least one configured primary secondary cell; performing (122) measurements related to at least one of the maintained primary secondary cells; transmitting (124) information related to the performed measurements towards the primary cell; when receiving a trigger (126) from the primary cell to access the associated primary secondary cell for which measurement information has been transmitted; accessing (128) the associated primary secondary cell.

FIG. 11*b* illustrates a flow chart for a method in view of a target Master Node according to an embodiment.

At the target master node for a radio access network, the method comprises preparing configuration information (130) comprising at least a handover execution condition for a primary cell and an execution condition for at least one primary secondary cell with delayed dual connectivity execution enabled, and sending the configuration information towards a user equipment; if it is determined (132) that the handover execution condition for the primary cell is satisfied but the execution condition for an associated primary secondary cell is not satisfied; in response (134) to received primary secondary cell related measurement results from the user equipment, deciding whether there is a chance for the execution condition for the associated primary secondary cell to be fulfilled in a predetermined time period; and if there is; enabling (136) completion of conditional handover to the primary cell and postponing enabling completion of execution of the associated primary secondary cell for dual connectivity; wherein during postponing (138); maintaining (140) the configuration of at least one configured primary secondary cell; receiving information (142) related to performed measurements related to at least one of the maintained primary secondary cells, from the user equipment; requesting (144) the user equipment to access the associated primary secondary cell for which measurement information has been received, by sending a trigger to the user equipment; enabling (146) the user equipment to access the associated primary secondary cell.

Figure 12:
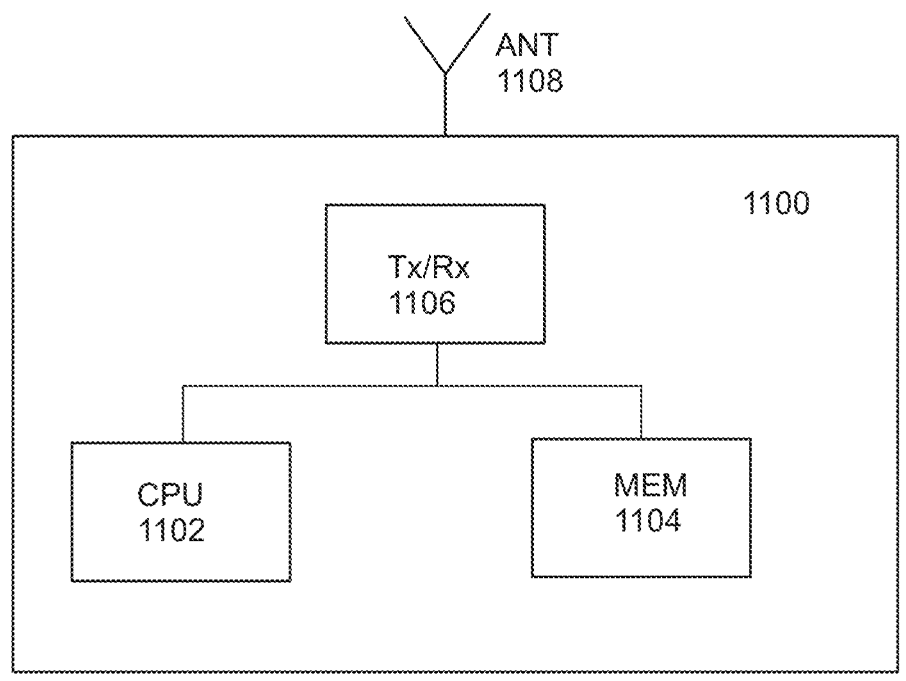
FIG. 12 illustrates a simplified block diagram of a network node according to an embodiment.

Such apparatuses may comprise e.g. the functional units disclosed in FIG. 12 showing a simplified block diagram of a network node, i.e. the apparatus, according to the aspects and the related embodiments. It is noted that while the above embodiments are mainly disclosed in connection with a target Secondary Node (SN), the structure and functional units as disclosed in FIG. 12 are equally applicable in any other network node, such as in a source MN, in a source SN and in a target MN, as disclosed above.

The network node 1100 of FIG. 12 may be a base station, an access point, an access node, a gNB, an evolved NodeB (eNB), a server, a host, or any other network entity that may communicate with the UE.

The apparatus may include at least one processor or control unit or module 1102 (marked as CPU). At least one memory 1104 may be provided in the apparatus. The memory may include computer program instructions or computer code contained therein. One or more transceivers 1106 may be provided, and the apparatus may also include an antenna 1108. Although only one antenna is shown, many antennas and multiple antenna elements may be provided in the apparatus. Other configurations of the apparatus, for example, may be provided. For example, in addition to wireless communication, the network node may be additionally configured for wired communication with the UE, and in such a case antenna 1108 may illustrate any form of communication hardware, without being limited to merely an antenna.

Transceiver 1106 may be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

In certain embodiments, the apparatus may comprise at least one processor and at least one memory including computer program code. The at least one memory including computer program code can be configured to, with the at least one processor, cause the apparatus at least to perform any of the processes described herein.

Processors 1102 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). The at least one memory 1104 may independently be any suitable storage device, such as a non-transitory computer-readable medium. A hard disk drive (HDD), random access memory (RAM), flash memory, or other suitable memory may be used. The memory may be combined on a single integrated circuit as the processor, or it may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network node 1100, to perform any of the processes described above. Therefore, in certain embodiments, a non-transitory computer-readable medium may be encoded with instructions or one or more computer program (such as added or updated software routine, applet or macro) that, when executed in hardware, may perform a process such as one of the processes described herein. In other embodiments, a computer program product may encode instructions for performing any of the processes described above, or a computer program product embodied in a non-transitory computer-readable medium and encoding instructions that, when executed in hardware, perform any of the processes describes above. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

According to an embodiment, a computer program comprises instructions stored thereon for causing an apparatus to perform at least the following:

receive configuration information comprising at least a handover execution condition for a primary cell and an execution condition for at least one primary secondary cell with delayed dual connectivity execution enabled;

determine whether the handover execution condition for the primary cell is satisfied and whether the execution condition for an associated primary secondary cell is satisfied; and if it is determined that the handover execution condition for the primary cell is satisfied but the execution condition for the associated primary secondary cell is not satisfied, enable completion of conditional handover to the primary cell and postpone enabling completion of execution of the associated primary secondary cell for dual connectivity, wherein during postponing, maintain the configuration of at least one configured primary secondary cell, perform measurements related to at least one of the maintained primary secondary cells, transmit information related to the performed measurements towards the primary cell, and when receiving a trigger from the primary cell to access the associated primary secondary cell for which measurement information has been transmitted, access the associated primary secondary cell.

According to an embodiment, a computer program comprises instructions stored thereon for causing an apparatus to perform at least the following:

prepare configuration information comprising at least a handover execution condition for a primary cell and an execution condition for at least one primary secondary cell with delayed dual connectivity execution enabled, and send the configuration information towards a user equipment;

if it is determined that the handover execution condition for the primary cell is satisfied but the execution condition for an associated primary secondary cell is not satisfied, in response to received primary secondary cell related measurement results from the user equipment, decide whether there is a chance for the execution condition for the associated primary secondary cell to be fulfilled in a predetermined time period; and if there is, enable completion of conditional handover to the primary cell and postpone enabling completion of execution of the associated primary secondary cell for dual connectivity, wherein during postponing, maintain the configuration of at least one configured primary secondary cell, receive information related to performed measurements related to at least one of the maintained primary secondary cells, from the user equipment, request the user equipment to access the associated primary secondary cell for which measurement information has been received, by sending a trigger to the user equipment, and enable the user equipment to access the associated primary secondary cell.

In certain embodiments, an apparatus may include circuitry or means configured to perform any of the processes or functions illustrated above. Circuitry, in one example, may be hardware-only circuit implementations, such as analog and/or digital circuitry. Circuitry, in another example, may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Specific examples of circuitry may be content coding circuitry, content decoding circuitry, processing circuitry, image generation circuitry, data analysis circuitry, or discrete circuitry. The term circuitry may also be, for example, a baseband integrated circuit or processor integrated circuit for a mobile device, a network entity, or a similar integrated circuit in server, a cellular network device, or other computing or network device. Besides various circuitries and their various examples as discussed above, respective other means may be applied as well for obtaining the same purpose and effect.

A further aspect and embodiment relate to a computer program product, stored on a non-transitory memory medium, comprising computer program code, which when executed by at least one processor, causes an apparatus at least to perform:

receive configuration information comprising at least a handover execution condition for a primary cell and an execution condition for at least one primary secondary cell with delayed dual connectivity execution enabled;

determine whether the handover execution condition for the primary cell is satisfied and whether the execution condition for an associated primary secondary cell is satisfied; and if it is determined that the handover execution condition for the primary cell is satisfied but the execution condition for the associated primary secondary cell is not satisfied, enable completion of conditional handover to the primary cell and postpone enabling completion of execution of the associated primary secondary cell for dual connectivity, wherein during postponing, maintain the configuration of at least one configured primary secondary cell, perform measurements related to at least one of the maintained primary secondary cells, transmit information related to the performed measurements towards the primary cell, and when receiving a trigger from the primary cell to access the associated primary secondary cell for which measurement information has been transmitted, access the associated primary secondary cell.

According to a further embodiment, there is a computer program product, stored on a non-transitory memory medium, comprising computer program code, which when executed by at least one processor, causes an apparatus at least to perform:

prepare configuration information comprising at least a handover execution condition for a primary cell and an execution condition for at least one primary secondary cell with delayed dual connectivity execution enabled, and send the configuration information towards a user equipment;

if it is determined that the handover execution condition for the primary cell is satisfied but the execution condition for an associated primary secondary cell is not satisfied, in response to received primary secondary cell related measurement results from the user equipment, decide whether there is a chance for the execution condition for the associated primary secondary cell to be fulfilled in a predetermined time period; and if there is, enable completion of conditional handover to the primary cell and postpone enabling completion of execution of the associated primary secondary cell for dual connectivity, wherein during postponing, maintain the configuration of at least one configured primary secondary cell, receive information related to performed measurements related to at least one of the maintained primary secondary cells, from the user equipment, request the user equipment to access the associated primary secondary cell for which measurement information has been received, by sending a trigger to the user equipment, and enable the user equipment to access the associated primary secondary cell.

In general, the various embodiments of the invention may be implemented in hardware or special purpose circuits or any combination thereof. While various aspects of the invention may be illustrated and described as block diagrams or using some other pictorial representation, it is well understood that these blocks, apparatuses, systems, techniques or methods described herein may be implemented in, as non-limiting examples, hardware, software, firmware, special purpose circuits or logic, general purpose hardware or controller or other computing devices, or some combination thereof.

Embodiments of the present invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiments of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. A user equipment for enabling conditional handover with delayed dual connectivity, and comprising at least one processor and at least one memory, said at least one memory stored with computer program code thereon, the at least one memory and the computer program code configured to, with the at least one processor, cause the user equipment at least to perform:

receiving configuration information comprising at least a handover execution condition for a primary cell and an execution condition for at least one primary secondary cell with delayed dual connectivity execution enabled;

determining whether the handover execution condition for the primary cell is satisfied and whether the execution condition for an associated primary secondary cell is satisfied; and if it is determined that the handover execution condition for the primary cell is satisfied but the execution condition for the associated primary secondary cell is not satisfied, enabling completion of conditional handover to the primary cell and postponing enabling completion of execution of the associated primary secondary cell for dual connectivity, wherein during postponing, maintaining the configuration of at least one configured primary secondary cell, performing measurements related to at least one of the maintained primary secondary cells, transmitting information related to the performed measurements towards the primary cell, and when receiving a trigger from the primary cell to access the associated primary secondary cell for which measurement information has been transmitted, accessing the associated primary secondary cell.

2. The user equipment according to claim 1, comprising computer program code configured to cause the user equipment to perform:

obtaining information of the primary cell from a distributed unit of a master node.

3. The user equipment according to claim 1, comprising computer program code configured to cause the user equipment to perform:

obtaining information of the primary secondary cell from a distributed unit of a secondary node.

4. The user equipment according to claim 1, comprising computer program code configured to cause the user equipment to perform:

the information related to the performed measurements comprises a request to a target master node to check the execution condition for the primary secondary cell based on the performed measurement information and identification of a primary secondary cell fulfilling the execution condition.

5. The user equipment according to claim 1, comprising computer program code configured to cause the user equipment to perform:

the trigger from the primary cell to access a primary secondary cell is a Radio Resource Control-based variant, comprising:

receiving a modified Radio Resource Control Reconfiguration with sync message from a target master node distributed unit;

sending a Radio Resource Control Reconfiguration complete to the target master node distributed unit.

6. The user equipment according to claim 1, comprising computer program code configured to cause the user equipment to perform:

the trigger from the primary cell to access a primary secondary cell is a physical downlink control channel order-based variant, comprising:

receiving a physical downlink control channel order from a target master node distributed unit.

7. The user equipment according to claim 1, comprising computer program code configured to cause the user equipment to perform:

the trigger from the primary cell to access a primary secondary cell is a downlink medium access control control element-based variant, comprising:

receiving an access secondary node downlink medium access control control element from a target master node distributed unit.

8. The user equipment according to claim 1, comprising computer program code configured to cause the user equipment to perform:

the trigger from the primary cell to access a primary secondary cell is based on at least one of the following:

current amount of downlink data waiting for transmission to the user equipment, current resource availability at a master node, current resource availability at a secondary node.

9. The user equipment according to claim 8, comprising computer program code configured to cause the user equipment to perform:

in case that at least two primary secondary cells have been identified fulfilling the respective execution condition, checking which primary secondary cell is best suited for dual connectivity, based on comparison of current load, and/or resource availability at the identified primary secondary cells.

10. The user equipment according to claim 1, comprising computer program code configured to cause the user equipment to perform:

accessing the associated primary secondary cell using a random access channel (RACH) or RACHless procedure, where the RACHless procedure is selected in case timing advance of the associated primary secondary cell is known via an early sync procedure.

11. The user equipment according to claim 1, comprising computer program code configured to cause the user equipment to perform:

instead of or in addition to maintaining the configuration of at least one configured primary secondary cell, applying the configuration of at least one configured primary secondary cell; and sending a confirmation of configuration application.

12. A method for enabling conditional handover with delayed dual connectivity, the method comprising:

receiving configuration information comprising at least a handover execution condition for a primary cell and an execution condition for at least one primary secondary cell with delayed dual connectivity execution enabled;

determining whether the handover execution condition for the primary cell is satisfied and whether the execution condition for an associated primary secondary cell is satisfied; and if it is determined that the handover execution condition for the primary cell is satisfied but the execution condition for the associated primary secondary cell is not satisfied, enabling completion of conditional handover to the primary cell and postponing enabling completion of execution of the associated primary secondary cell for dual connectivity, wherein during postponing, maintaining the configuration of at least one configured primary secondary cell, performing measurements related to at least one of the maintained primary secondary cells, transmitting information related to the performed measurements towards the primary cell, and when receiving a trigger from the primary cell to access the associated primary secondary cell for which measurement information has been transmitted, accessing the associated primary secondary cell.

13. A target master node for a radio access network for enabling conditional handover with delayed dual connectivity, the target master node comprising at least one processor and at least one memory, said at least one memory stored with computer program code thereon, the at least one memory and the computer program code configured to, with the at least one processor, cause the target master node at least to perform:

preparing configuration information comprising at least a handover execution condition for a primary cell and an execution condition for at least one primary secondary cell with delayed dual connectivity execution enabled, and sending the configuration information towards a user equipment;

if it is determined that the handover execution condition for the primary cell is satisfied but the execution condition for an associated primary secondary cell is not satisfied, in response to received primary secondary cell related measurement results from the user equipment, deciding whether there is a chance for the execution condition for the associated primary secondary cell to be fulfilled in a predetermined time period; and if there is, enabling completion of conditional handover to the primary cell and postponing enabling completion of execution of the associated primary secondary cell for dual connectivity, wherein during postponing, maintaining the configuration of at least one configured primary secondary cell, receiving information related to performed measurements related to at least one of the maintained primary secondary cells, from the user equipment, requesting the user equipment to access the associated primary secondary cell for which measurement information has been received, by sending a trigger to the user equipment, and enabling the user equipment to access the associated primary secondary cell.

14. The target master node according to claim 13, comprising computer program code configured to cause the target master node to perform:

the received information related to the performed measurements comprises a request from the user equipment to check the execution condition for the primary secondary cell based on the performed measurement information and identification of a primary secondary cell fulfilling the execution condition.

15. The target master node according to claim 13, comprising computer program code configured to cause the target master node to perform:

the trigger from the primary cell to access a primary secondary cell is a Radio Resource Control-based variant, comprising:

sending a Radio Resource Control Reconfiguration with sync message from a target master node centralized unit to a target master node distributed unit;

sending a modified Radio Resource Control Reconfiguration with sync message from the target master node distributed unit to the user equipment; and receiving a Radio Resource Control Reconfiguration complete from the user equipment to the target master node distributed unit, and further forwarding the Radio Resource Control Reconfiguration complete to the target master node centralized unit.

16. The target master node according to claim 13, comprising computer program code configured to cause the target master node to perform:

the trigger from the primary cell to access a primary secondary cell is a physical downlink control channel order-based variant, comprising:

sending a request to trigger user equipment synchronization to a target secondary node, from a target master node centralized unit to a target master node distributed unit;

sending a physical downlink control channel order from the target master node distributed unit to the user equipment; and sending a response message that the access request has been sent, from the target master node distributed unit to the target master node centralized unit.

17. The target master node according to claim 13, comprising computer program code configured to cause the target master node to perform:

the trigger from the primary cell to access a primary secondary cell is a downlink medium access control control element-based variant, comprising:

sending a request to trigger user equipment synchronization to a target secondary node, from a target master node centralized unit to a target master node distributed unit;

sending an access secondary node downlink medium access control control element from the target master node distributed unit to the user equipment; and sending a response message that the access request has been sent, from the target master node distributed unit to the target master node centralized unit.

18. The target master node according to claim 13, comprising computer program code configured to cause the target master node to perform:

the trigger from the primary cell to access a primary secondary cell is based on at least one of the following: current amount of downlink data waiting for transmission to the user equipment, current resource availability at a master node, current resource availability at a secondary node.

19. The target master node according to claim 18, comprising computer program code configured to cause the target master node to perform:

in case that at least two primary secondary cells have been identified fulfilling the respective execution condition, checking which primary secondary cell is best suited for dual connectivity, based on comparison of current load, and/or resource availability at the identified primary secondary cells.

20. The target master node according to claim 13, comprising computer program code configured to cause the target master node to perform:

requesting the user equipment to access the associated primary secondary cell using a random access channel (RACH) or RACHless procedure, where the RACHless procedure is selected in case timing advance of the associated primary secondary cell is known via an early sync procedure.

21. The target master node according to claim 13, comprising computer program code configured to cause the target master node to perform:

instead of or in addition to maintaining the configuration of at least one configured primary secondary cell, applying the configuration of at least one configured primary secondary cell; and sending a confirmation of configuration application.

22. A method for enabling conditional handover with delayed dual connectivity, the method comprising:

preparing configuration information comprising at least a handover execution condition for a primary cell and an execution condition for at least one primary secondary cell with delayed dual connectivity execution enabled, and sending the configuration information towards a user equipment;

if it is determined that the handover execution condition for the primary cell is satisfied but the execution condition for an associated primary secondary cell is not satisfied, in response to received primary secondary cell related measurement results from the user equipment, deciding whether there is a chance for the execution condition for the associated primary secondary cell to be fulfilled in a predetermined time period; and if there is, enabling completion of conditional handover to the primary cell and postponing enabling completion of execution of the associated primary secondary cell for dual connectivity, wherein during postponing, maintaining the configuration of at least one configured primary secondary cell, receiving information related to performed measurements related to at least one of the maintained primary secondary cells, from the user equipment, requesting the user equipment to access the associated primary secondary cell for which measurement information has been received, by sending a trigger to the user equipment, and enabling the user equipment to access the associated primary secondary cell.

* * * * *